United States Patent [19]

Tateno et al.

[11] Patent Number: 5,680,784
[45] Date of Patent: Oct. 28, 1997

[54] METHOD OF CONTROLLING FORM OF STRIP IN ROLLING MILL

[75] Inventors: Junichi Tateno; Kazuya Asano; Takayuki Kaji; Masashi Hoshino; Satoshi Tsuzuki, all of Chiba; Motoji Shiozumi; Akinobu Kamimaru, both of Kobe; Chikara Osaka, Chiba, all of Japan

[73] Assignee: Kawasaki Steel Corporation, Kobe, Japan

[21] Appl. No.: 401,446

[22] Filed: Mar. 9, 1995

[30] Foreign Application Priority Data

Mar. 11, 1994 [JP] Japan ..................... 6-040869
Mar. 30, 1994 [JP] Japan ..................... 6-061022

[51] Int. Cl.$^6$ ........................................ B21B 37/00
[52] U.S. Cl. ..................... 72/8.7; 72/11.7; 72/365.2
[58] Field of Search ........................ 72/7.2, 7.4, 8.3, 72/8.7, 9.1, 11.7, 365.2; 364/149, 151, 472; 395/2.68

[56] References Cited

U.S. PATENT DOCUMENTS

| 5,111,531 | 5/1992 | Grayson et al. | 364/162 |
| 5,193,066 | 3/1993 | Konishi et al. | 364/472 |
| 5,414,619 | 5/1995 | Katayama et al. | 364/151 |
| 5,430,642 | 7/1995 | Nakajima et al. | 364/148 |

FOREIGN PATENT DOCUMENTS

| A-4-111910 | 4/1992 | Japan . |
| A-4-127908 | 4/1992 | Japan . |
| A-4-167908 | 6/1992 | Japan . |
| A-4-238614 | 8/1992 | Japan . |
| A-6-198319 | 7/1994 | Japan . |

OTHER PUBLICATIONS

*The Iron and Steel Institute of Japan*, pp. 265–269, published on Sep. 1, 1984, "Theory in Practice of Flat Rolling".

Primary Examiner—Lowell A. Larson
Assistant Examiner—Ed Tolan
Attorney, Agent, or Firm—Oliff & Berridge

[57] ABSTRACT

A method of controlling a form of a strip in a rolling mill. A plurality of paired data of manipulation amounts of form control actuators, and amounts of variations in the form of the strip corresponding to the manipulation amounts are prepared, as prototype manipulation examples. Calculation is performed to obtain a degree of similarity between an actual form error representing difference between an actual form of the strip and a target form, and variations in the form of the prototype manipulation examples. Then, actuator manipulation amounts of the prototype manipulation examples are weighted in accordance with calculated degree of the similarity, and the actuators are manipulated based on weighted actuator manipulation amounts.

9 Claims, 19 Drawing Sheets

METHOD OF CONTROLLING FORM OF STRIP IN ROLLING MILL

BACKGROUND OF THE INVENTION

1. Field of the Invention

The present invention relates to a method of controlling the form of a material rolled by a rolling mill (hereinafter referred to as a "strip"), and more particularly to a method which is capable of carrying out good form control in a rolling mill, such as a multistage rolling mill, equipped with a plurality of form control actuators wherein influence of the actuators on variations in the form cannot be quantified.

2. Prior Art

Recently, a higher accuracy in dimensions and form has been demanded when rolling a thin plate such as a steel plate. Accordingly, control of the form in addition to the thickness of a strip and control of the crown of rolls have become more important.

Methods of controlling the form of a strip using form control actuators provided in a rolling mill are categorized as follows:

(1) a first method in which feedback control is performed based on values representing an actual form which is detected during rolling operation so as to properly control form control actuators; and (2) a second method in which initial setting of form control actuators are optimally performed based on rolling conditions before starting rolling operation.

In the first method (1) of feedback controlling the form of a strip which have been proposed in the past, a rolling mill is generally used which is equipped with a form detector for detecting the form of a strip, and form control actuators. An output from the form detector is processed using a predetermined control algorithm to calculate manipulation amounts of the form control actuators. The actuators are manipulated in accordance with the calculated manipulation amounts to control the form of the strip.

For example, form data obtained by the form detector are approximated by an orthogonal quartic function, and the components of the respective orders of the function are previously made to have predetermined relationships with actuators. Influence of the manipulation amount of each actuator on variation in the magnitude of the component of the corresponding order is linearly approximated to obtain an influence coefficient. The magnitude of the component of each order calculated from the form data actually obtained is divided by the influence coefficient to obtain an manipulation amount.

However, multistage rolling mills such as a Sendzimir mill have problems that the form of a strip is difficult to express due to its complexity, and that the influence of manipulation amounts of a plurality of form control actuators provided therein on the form of the strip is difficult to quantify. Therefore, it is difficult to conduct automatic control.

A few proposals have already been made to solve this problem. Japanese Patent Application Laid-Open (kokai) No. 4-111910 discloses a method of controlling the form of a strip in which the form of the strip is detected by a plate form detector provided on the exit side of a multistage rolling mill, and the current form of the strip is predicted based on the detected form and an earlier manipulation amount of each actuator. Subsequently, the value of an evaluation function is calculated taking account of the difference between the predicted form of the strip and a target form and variation in the thickness of the strip due to operation of each actuator. A manipulation amount of each actuator is then calculated such that the value of the evaluation function is minimized, and the actuator is manipulated in accordance with the calculated manipulation amount.

Japanese Patent Application Laid-Open (kokai) No. 4-127908 discloses a method of controlling the form of a strip in which the form of a strip is detected and is categorized as being one of a number of previously prepared form patterns. The manner of operation of a rolling mill is previously determined for each of the form patterns. The rolling mill is controlled in a manner corresponding to the recognized form pattern. In one embodiment, a neural network of a multi-layer type (hierarchy type) is used to categorize the pattern, and fuzzy inference is applied to obtain a manipulation amount for each actuator of the rolling mill based on the categorization.

Japanese Patent Application Laid-Open (kokai) No. 4-238614 discloses a method of controlling the form of a strip in which a similar form pattern is selected from prototype form patterns based on a form detected by a form detector. An actuator to be manipulated is determined in accordance with the selected prototype form pattern, and a form parameter corresponding to the actuator to be manipulated is determined. Then, the value of the form parameter is calculated, based on which an manipulation amount of the actuator is calculated.

As described above, multistage rolling mills such as a Sendzimir mill have problems that the form of a strip is difficult to express due to its complexity, and that the influence of manipulation amounts of a plurality of form control actuators on the form of the strip is difficult to quantify. From the viewpoint of solving these problems, the above-described conventional methods are not satisfactory, as described below.

In the method disclosed in Japanese Patent Application Laid-Open (kokai) No. 4-111910, the influence of the manipulation amount of each actuator is directly related to each sensor element of the form detector while tracing back rolling operation to the past. Accordingly, it is difficult to accurately obtain each of the influence coefficients, and the evaluation function cannot optimally evaluate the form if any one of the influence coefficients contains an error.

In the method disclosed in Japanese Patent Application Laid-Open (kokai) No. 4-127908, the manipulation amount of each actuator is obtained from the results of categorization of a form pattern by providing influence coefficients in a top-to-bottom manner using fuzzy inference or the like. Accordingly, the accuracy is not satisfactory. Also, since a multi-layer neural network is used for categorizing a form pattern, the results of perception greatly vary as the learning of the neural network proceeds. Accordingly, a value output from the neural network is not sufficiently reliable to input to the rear part of the fuzzy inference as a degree of certainty.

In the method disclosed in Japanese Patent Application Laid-Open (kokai) No. 4-238614, a prototype form pattern which is the most similar to the form of a strip is selected, and a manipulation amount of each actuator corresponding thereto is calculated. Accordingly, like the method disclosed in Japanese Patent Application Laid-Open (kokai) No. 4-111910, it has the problem of inaccuracy with respect to the influence coefficients which represent the relationship between the form parameter corresponding to the prototype form pattern and the manipulation amount of the actuator.

As described above, methods have been proposed in which the form of a strip is categorized, and the selection of actuators and the calculation of manipulation amounts are performed based on the categorized form. However, all the methods have the problem of inaccuracy in the influence coefficients which represent the relationship between the form or parameters representing the form and manipulation amounts of actuators, or in an equation for performing inference which is equivalent to the influence coefficients. Accordingly, sufficient feedback control accuracy cannot be obtained.

Further, with regard to the second method (2) for initial setting, in a rolling mill which has several form control actuators to obtain a desired form (flatness and steepness) in rolling a steel plate or the like, it is generally very difficult to theoretically obtain initial set values for the control actuators for obtaining a target form.

Accordingly, in many cases, a so-called table method is used in which initial set values are obtained by referring to a set value table, the contents of which are previously determined. In the table method, rolling conditions (kind of steel, reduction value, diameter of rolling roll, etc.) for strips are categorized based on past results, and optimal set values for the control actuators are determined for each category.

Japanese Patent Application Laid-Open (kokai) No. 4-167908 discloses a method in which influence factors, i.e., factors having an influence on the flatness (form) of a strip are input to a neural network to calculate initial set values. In this method, values representing the form actually obtained through a rolling operation using certain set values are input to an optimal set value calculation unit to calculate optimal set values for control actuators. The influence factors and the set values for the control actuators are accumulated as paired data, which are subsequently used for learning operation of the neural network. The neural network has a layered or hierarchy structure and performs a learning procedure through error back-propagation learning wherein the influence factors are used as an input and the set values of the control actuators are used as an output.

The above-described table method has the problem that its accuracy is greatly affected by the way of categorizing. That is, if the rolling conditions are roughly categorized, it becomes difficult to obtain optimal values. On the contrary, if the rolling conditions are finely categorized, the size of the table increases, thereby increasing the effort to prepare and maintain the table.

The neural network (layered type, error back-propagation learning type) disclosed in Japanese Patent Application Laid-Open (kokai) No. 4-167908 has problems in relation to the convergence of learning. The problems are caused due to the calculation for convergence in which the difference (i.e., an error) between the output of the neural network and a teaching signal is calculated as an evaluation function (loss function), and the calculation for convergence is performed to minimize the evaluation function. Accordingly., there are problems that the learning procedure requires a very long time, and that the calculation does not converge if it falls in a local minimal solution.

Although values calculated by the optimal set value calculating means are used as data for learning procedures in place of data representing actual results of rolling, this learning procedure has drawbacks. That is, the optimal set value calculating means itself is difficult to make. Moreover, since values calculated by the optimal set value calculating means inevitably include errors and the learning procedure of the neural network is performed using the teaching data including such errors, the accuracy of the neural network drops.

In the neural network of the above-mentioned type, the inside structure of the neural network which connects its input and output is unknown, i.e., it is a black box. Therefore, it is impossible to cause the neural network to perform an inverse calculation in which an input is calculated from an output. Accordingly, in a case where influence factors (rolling conditions) and a desired form are input, as input data, to a neural network so as to obtain set values for control actuators, and when the error of the output value for specific input data becomes too large, such a neural network cannot be applied to inversely calculate a form from the influence factors and the set values for the control actuators to verify the cause of the problem.

SUMMARY OF THE INVENTION

An object of the present invention is to solve the above-described conventional problems relating to the feedback control of the first method (1) and to provide a method of controlling the form of a strip in a rolling mill which is capable of carrying out good form control even in the case of using a multistage rolling mill such as a Sendzimir mill in which the form of a strip cannot be automatically controlled because of the problems that the form of the strip is difficult to express due to its complexity, and that the influence of manipulation amounts of a plurality of form control actuators on the form of the strip is difficult to quantify.

Another object of the present invention is to solve the above-described conventional problems relating to the initial setting of the second method (2) and to provide a method of controlling the form of a strip which makes it possible to easily and accurately determine and set optimal initial set values for form control actuators based on actual results of rolling, without using a table.

According to a first aspect of the present invention, there is provided a method of controlling the form of a strip in a rolling mill having a form detector for detecting the form of a strip and actuators for correcting the form (hereinafter referred to as "form control actuators"), and the form control actuators being manipulated based on output of the form detector. The method includes the steps of preparing, as prototype manipulation examples, a plurality of paired data of manipulation amounts of the form control actuators and the amounts of variations in the form of the strip corresponding to the manipulation amounts, calculating the degree of similarity between an actual form error representing the difference between an actual form of the strip detected by the form detector and a target form, and variations in the form of the prototype manipulation examples, weighting actuator manipulation amounts contained in the prototype manipulation examples in accordance with the calculated degree of similarity, and manipulating the form control actuators based on the weighted actuator manipulation amounts.

In the method according to the first aspect, it is preferred to use a neural network of a radius basic function type to prepare and maintain the prototype manipulation examples, and to perform calculation using the prototype manipulation examples.

In the method according to the first aspect, it is preferred to accumulate, as actual result data, data representing manipulations of the actuators during rolling operation and variation in the form due to the manipulations of the actuators, and to perform renewal such as correction or addition against the prototype manipulation examples at an arbitrary timing.

In the method according to the first aspect, it is also preferred that a neural network of a radius basic function type be used to prepare and maintain the prototype manipulation examples, and to perform calculation using the prototype manipulation examples, and that data representing manipulations of the actuators during rolling operation and variation in the form due to the manipulations of the actuators be accumulated, as actual result data, and renewal such as correction or addition be performed against the prototype manipulation examples at an arbitrary timing.

According to the second aspect of the present invention, there is provided a method of controlling the form of a strip in a rolling mill having a form detector for detecting the form of a strip and form control actuators, and the form control actuators being manipulated based on output of the form detector. The method includes the steps of preparing, as prototype form examples, a plurality of paired data, each paired data including variation in the form of the strip and a composition ratio obtained by decomposing the variation in the form into a predetermined standard form pattern, preparing, as prototype manipulation examples, a plurality of paired data, each paired data including manipulation amounts of the form control actuators and a composition ratio obtained by decomposing the variation in the form, which corresponds to the manipulation amounts, into a standard form pattern, calculating the degree of similarity between an actual form error representing the difference between an actual form of the strip detected by the form detector and a target form, and variations in the form of the prototype form examples, weighting the composition ratios of the prototype form examples in accordance with the calculated degree of similarity, calculating the degree of similarity between the weighted composition ratio and the composition ratios of the prototype manipulation examples, weighting actuator manipulation amounts contained in the prototype manipulation examples in accordance with the calculated degree of similarity, and manipulating the form control actuators based on the weighted actuator manipulation amounts.

In the method according to the second aspect, it is preferred to use a neural network of a radius basic function type to prepare and maintain the prototype form examples and the prototype manipulation examples, and to perform calculation using those examples.

In the method according to the second aspect, it is preferred to accumulate, as actual result data, data representing manipulations of the actuators during rolling operation and variation in the form due to the manipulations of the actuators, and to perform renewal such as correction or addition against the prototype form examples and the prototype manipulation examples at an arbitrary timing.

In the method according to the second aspect, it is also preferred that a neural network of a radius basic function type be used to prepare and maintain the prototype form examples and the prototype manipulation examples, and to perform calculation using those examples, and that data representing manipulations of the actuators during rolling operation and variation in the form due to the manipulations of the actuators be accumulated, as actual result data, and renewal such as correction or addition be performed against the prototype form examples and prototype manipulation examples at an arbitrary timing.

The methods according to the first and second aspects of the present invention employ the first method (1).

In the method according to the first aspect, a plurality of paired data of manipulation amounts of the form control actuators, and the amounts of variations in the form of the strip corresponding to the manipulation amounts are prepared, as prototype manipulation examples. Calculation is performed to obtain the degree of similarity between an actual form error representing the difference between an actual form of the strip detected by the form detector and a target form, and variations in the form of the prototype manipulation examples. Then, actuator manipulation amounts contained in the prototype manipulation examples are weighted in accordance with the calculated degree of similarity, and the form control actuators are manipulated based on the weighted actuator manipulation amounts. Accordingly, the form of the strip can be accurately controlled.

In the case where correction or addition is performed against the prototype manipulation examples at an arbitrary timing, the control performance can be maintained or improved.

The prototype manipulation examples are extracted from the actual results of rolling operation, and are represented by using specific examples of the causal relationship between the manipulation amounts of the actuators and variations in the form. In other words, the fact that "an operation of each actuator by a certain amount leads to a certain amount of variation in the form" is represented using numerical values. Accordingly, the relationship can be intuitively understood.

In some cases, the relationship between the manipulation amounts of the actuators and variations in the form is nonlinear. To this end, many prototype manipulation examples are provided, from which a plurality of examples which are similar to a control procedure to be performed at the present are selected, and are weighted in accordance with the degree of similarity so as to obtain manipulation amounts. Accordingly, the method of the present invention can cope with the case where the relationship between manipulation amounts of the actuators and variations in the form is nonlinear.

In the method according to the second aspect, a plurality of paired data are prepared as prototype form examples. Each paired data include variation in the form of the strip and a composition ratio obtained by decomposing the variation in the form into predetermined standard form patterns. Separately, a plurality of paired data are prepared as prototype manipulation examples. Each paired data include manipulation amounts of the form control actuators and a composition ratio obtained by decomposing the variation in the form, which corresponds to the manipulation amount, into standard form patterns. Calculation is performed to obtain the degree of similarity between an actual form error representing the difference between an actual form of the strip detected by the form detector and a target form, and variations in the form of the prototype form examples. Then, the composition ratios of the prototype form examples are weighted in accordance with the calculated degree of similarity, and the degree of similarity between the weighted composition ratio and the composition ratios of the prototype manipulation examples is calculated. Also, actuator manipulation amounts contained in the prototype manipulation examples are weighted in accordance with the calculated degree of similarity. The form control actuators are manipulated based on the weighted actuator manipulation amounts. With this method, the form of the strip can be automatically controlled with high accuracy.

Accordingly, the above described methods according to the first and second aspects of the present invention make it possible to carry out feedback control of form even in the case of a multistage rolling mill in which the form of a strip cannot be automatically feedback controlled due to the problems that the form of a strip is difficult to express due to its complexity, and that the influence of manipulation amounts of a plurality of form control actuators on the form of the strip is difficult to quantify.

In the case where data representing manipulations of the actuators during rolling operation and variation in the form due to the manipulations of the actuators are accumulated as actual data and correction or addition is performed against the prototype manipulation examples, or the prototype form examples and the prototype manipulation examples at an arbitrary timing, the control performance can be maintained or improved.

Especially, in the case where a neural network of a radius basic function type is used to prepare and maintain the prototype manipulation examples, or prototype form examples and the prototype manipulation examples and to perform calculation using those examples, it becomes easier to prepare and maintain the prototype manipulation examples, or prototype form examples and the prototype manipulation examples and to perform calculation using those examples.

Moreover, when correction and/or addition of the prototype form examples or the prototype manipulation examples (intermediate units of a neural network) is performed using the data representing manipulation amounts of the actuators during rolling operation and variations in the form due to the manipulations of the actuators, the control performance can be maintained or improved.

According to the third aspect of the present invention, there is provided a method of controlling the form of a strip in a rolling mill wherein form control actuators for controlling the form of a strip are previously set before rolling the strip. The method includes the steps of providing a group of form control result data which represent past results of rolling operation and each of which contains a set of data representing rolling conditions for a strip, set values for the form control actuators, and a form index of the strip, extracting a plurality of prototype form control result data from the group of form control result data to hold them as a group of form control standard data, providing rolling conditions and a target form index before starting a rolling operation to obtain the degree of similarity of the rolling conditions and the target form index to the form control standard data, and calculating initial set values for the form control actuators by composing set values for the form control actuators contained in the form control standard data in accordance with the degree of similarity, so that optimal initial set values for form control actuators can be determined and set easily and accurately without using a table.

In the method according to the third aspect of the invention, it is preferred to use, as the form index, the distribution of stretching ratios in the widthwise direction of the strip which are measured in narrow channel regions each having a constant width.

In the method according to the third aspect of the invention, it is also preferred to calculate the distribution of stretching ratios in the widthwise direction of the strip which are measured in narrow channel regions each having a constant width, normalize the distribution of stretching ratios based on the width of the strip, and use the normalized data as the form index.

In the method according to the third aspect of the invention, it is also preferred to use, as the form index, only symmetrical components of the form data by removing asymmetrical components from the original data when the movements of the form control actuators used in initial setting are limited to symmetrical movements in the widthwise direction of the strip.

In the method according to the third aspect of the invention, it is also preferred to use a simulation model in which physical phenomena of rolling operation is simulated to calculate form data from rolling conditions and initial set values for form control actuators, and to add thus calculated data to the group of form control result data representing past rolling results.

The method according to the third aspect of the present invention is preferably to further include the steps of obtaining the degree of similarity of the rolling conditions and the set values of the form control actuators to the form control standard data, calculating a form index by composing the form index of the form control standard data in accordance with the degree of similarity, and extracting a plurality of prototype form control result data from the group of form control result data, into which new results of rolling operation have been added, to hold them as the group of form control standard data when an error between an actual form measured in actual rolling and the form index exceeds predetermined value.

The method according to the third aspect of the present invention employs the second method (2).

That is, in the method according to the third aspect of the present invention, there is provided a group of form control result data which represent past results of rolling operation and each of which contains a set of data representing rolling conditions for a strip, set values for the form control actuators, and a form index of the strip. A plurality of prototype form control result data are extracted from the group of form control result data to hold them as a group of form control standard data. Rolling conditions and a target form index are provided before starting a rolling operation to obtain the degree of similarity of the rolling conditions and the target form index to the form control standard data. Thereafter, initial setting value for the form control actuators are calculated by composing set values for the form control actuators contained in the form control standard data in accordance with the degree of similarity. Accordingly, it becomes unnecessary to make a table from which set values are obtained for the form control actuators, and it becomes possible to determine and set optimal initial set values based on the actual results of rolling operation.

Also, since calculation for convergence to minimize the error evaluation function is not performed in the procedure of learning actual result data, the learning procedure can be easily performed in a shorter time. Also, it is possible to solve the problem that the learning procedure does not converge due to a local minimal solution.

In the present invention, it is not necessary to make optimal set value calculating means to obtain data for a learning procedure. Also, since data representing actual results of rolling operation are directly used, teaching data used for a learning procedure of the neural network do not contain errors which are produced in the optimal set value calculating means. Accordingly, optimal set value can be calculated accurately.

When the output value for a specific input data becomes improper, a form can be calculated from the influence factors and setting values for the form control actuators to verify the cause of the problems. Accordingly, optimal set values can be calculated accurately.

The same result can be obtained in the case where stretching ratios in the widthwise direction are measured in narrow channel regions of a strip each having a constant width, and the distribution of the stretching ratios of the strip is calculated to be used as the form index. Also, in the case where the distribution of stretching ratios is standardized based on the width of the strip, the form index can be obtained independently from the number of the narrow channel regions.

Also, the same results can be obtained by using only symmetrical components of the form data as the form index if the movements of the form control actuators used in initial setting are limited to symmetrical movements in the widthwise direction of the strip. The symmetrical components can be obtained by removing asymmetrical components from the original data.

Also, when a simulation model is used to simulate physical phenomena of rolling operation so as to calculate form data from rolling conditions and initial set values for form control, and thus calculated data are added to the group of form control result data representing past rolling results, initial setting operation for form control can be carried out accurately even in the case where data representing actual results cannot be sufficiently obtained.

Moreover, in the method according to the third aspect of the invention, the following learning procedure can be performed. There is provided a group of form control result data which represent past results of rolling operation and each of which contain a set of data representing rolling conditions for a strip, set values for form control actuators, and a form index of the strip. A plurality of prototype form control result data are extracted from the group of form control result data to hold them as a group of form control standard data. Rolling conditions and a target form index are provided before starting a rolling operation, and the degree of similarity of the rolling conditions and the target form index to the form control standard data is obtained. Thereafter, initial set values for the form control actuators are calculated by composing set values for the form control actuators contained in the form control standard data in accordance with the degree of similarity. Further, the degree of similarity of the rolling conditions and the target form index to the form control standard data is obtained, and a form index is calculated by composing the form index of the form control standard data in accordance with the degree of similarity. When an error between an actual form measured in actual rolling and the form index exceeds predetermined value, a plurality of prototype form control result data are extracted from the group of form control result data, into which new results of rolling have been added, to hold them as the group of form control standard data. By learning whenever the error between a form predicted by a "BACK OPERATION" and an actual form measured during actual rolling operation becomes larger than a predetermined value, the accuracy of the neural network can be maintained.

BRIEF DESCRIPTION OF THE ACCOMPANYING DRAWINGS

The preferred embodiments will be described in detail with reference to the accompany drawings, wherein like elements are denoted throughout the figures with like reference numerals, and wherein.

DESCRIPTION OF THE PREFERRED EMBODIMENTS

Embodiments of the present invention will now be described in more detail with reference to the accompanying drawings.

Figure 1:
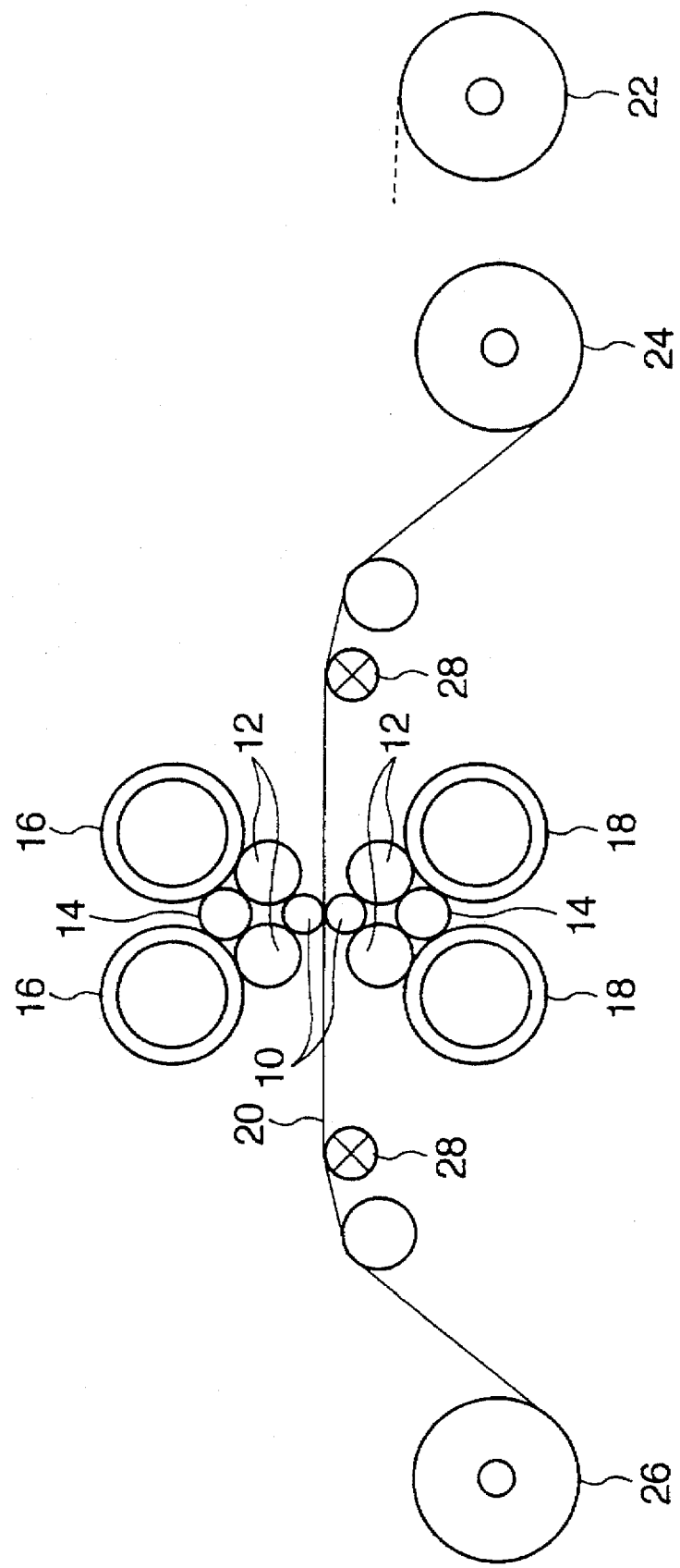
FIG. 1 is a side view schematically showing the structure of a multistage rolling mill having twelve stages to which methods according to the present invention are applied.

The present embodiments show examples of form control used in strip rolling. FIG. 1 is a side view schematically showing a rolling facility equipped with a cluster type multistage rolling mill having twelve stages to which the methods according to the embodiment are applied.

As shown in FIG. 1, rolls of twelve stages are composed of one pair of upper and lower work rolls 10, two pairs of upper and lower intermediate rolls 12, one pair of upper and lower small backup rolls 14, two upper backup rolls 16, and two lower backup rolls 18.

In the multistage rolling mill, a material to be rolled (strip) 20 supplied from a right-hand tension reel 24 or a left-hand tension reel 26 is rolled by the work rolls 10, and is then taken up by the other tension reel. In some cases, the strip 20 is supplied from a payoff reel 22. At this time, the form in the widthwise direction of the strip 20 which has been rolled by the work rolls 10 is detected by a form detector 28.

Figure 2:
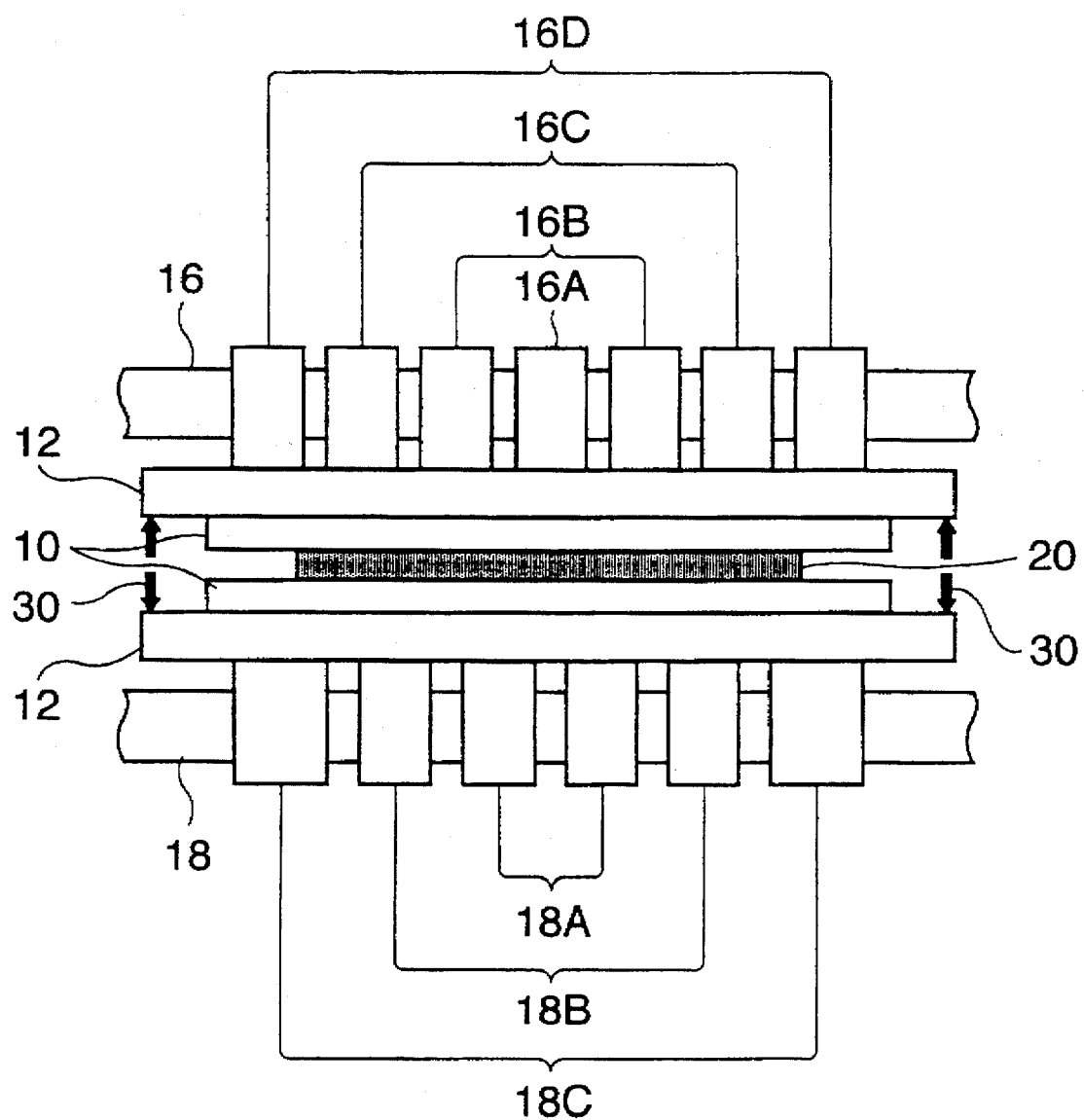
FIG. 2 is a front view schematically showing the structure of the form control actuators and the rolling mechanism of the multistage rolling mill shown in FIG. 1.

FIG. 2 is a front view schematically showing the structure of form control actuators and a rolling mechanism provided in the above-describe multistage rolling mill. The strip 20 is pressed by the work rolls 10 from the upper and lower sides so that the strip 20 is stretched to be thinner.

Each of the upper backup rolls 16 is divided into seven portions, i.e., a center portion 16A, quarter-in portions 16B, quarter-out portions 16C, and edge portions 16D. These portions provide downward reduction pressure, while maintaining the symmetry, to adjust the crown of the rolls. Similarly, each of the lower backup rolls 18 is divided into six portions, i.e., center portions 18A, quarter portions 18B, and edge portions 18C. These portions provide upward reduction pressure, while maintaining the symmetry, to adjust the crown of the rolls. The multistage rolling mill is equipped with, as form control actuators, unillustrated roll crown adjusting devices for upper and lower backup rolls 16 and 18, intermediate roll benders 30 shown by the arrows, and unillustrated reduction leveling devices for adjusting the difference in reduction positions between the manipulating side and the drive side.

The lower backup rolls 18 are fixed to positions corresponding to initial set values, and only the roll crown adjusting devices for driving the divided parts of the upper backup rolls 16, the intermediate roll benders 30, and the reduction leveling devices can be manipulated during rolling operation.

Figure 3:
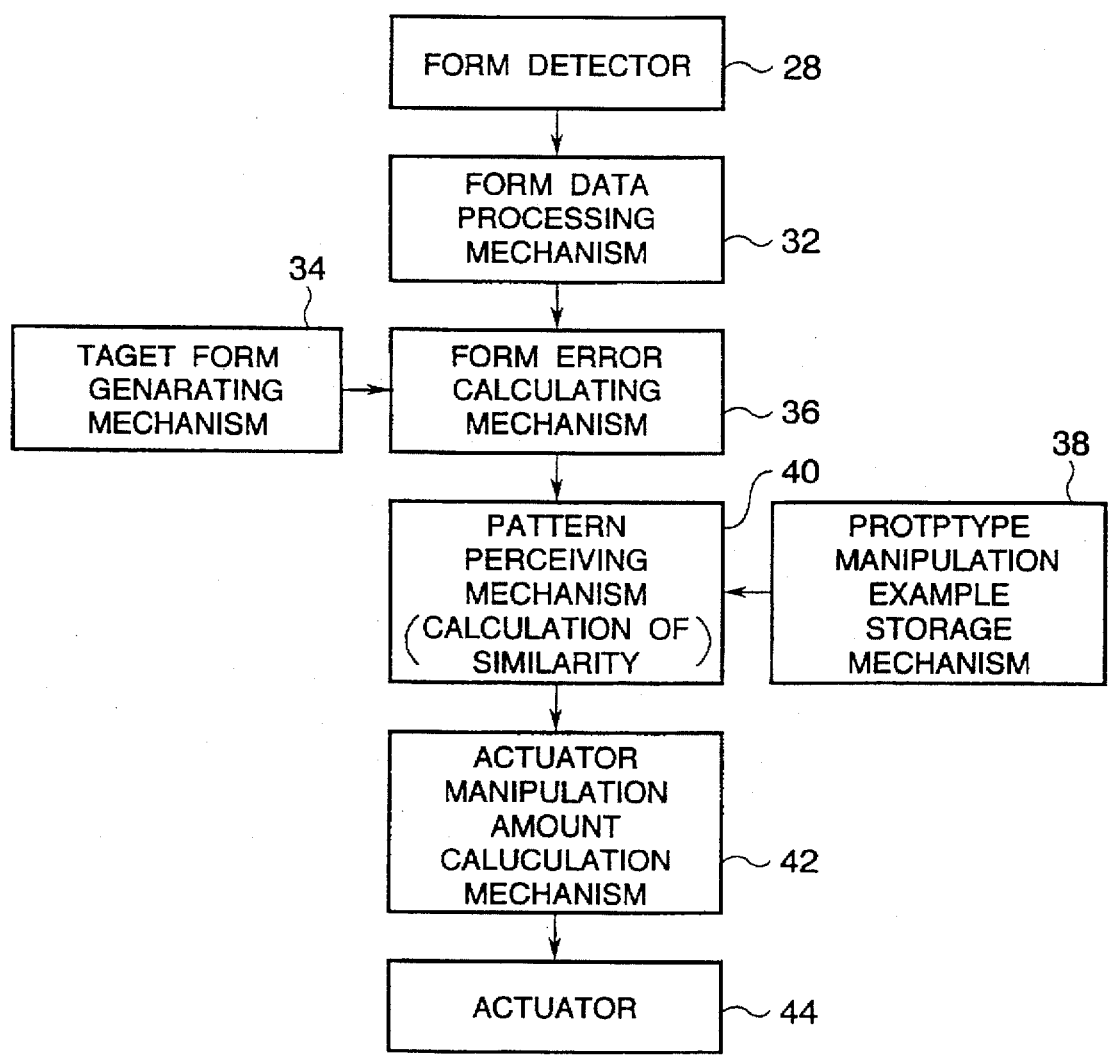
FIG. 3 is a block diagram showing a control mechanisms and a flow of processing data according to a first embodiment of the present invention.
Figure 4:
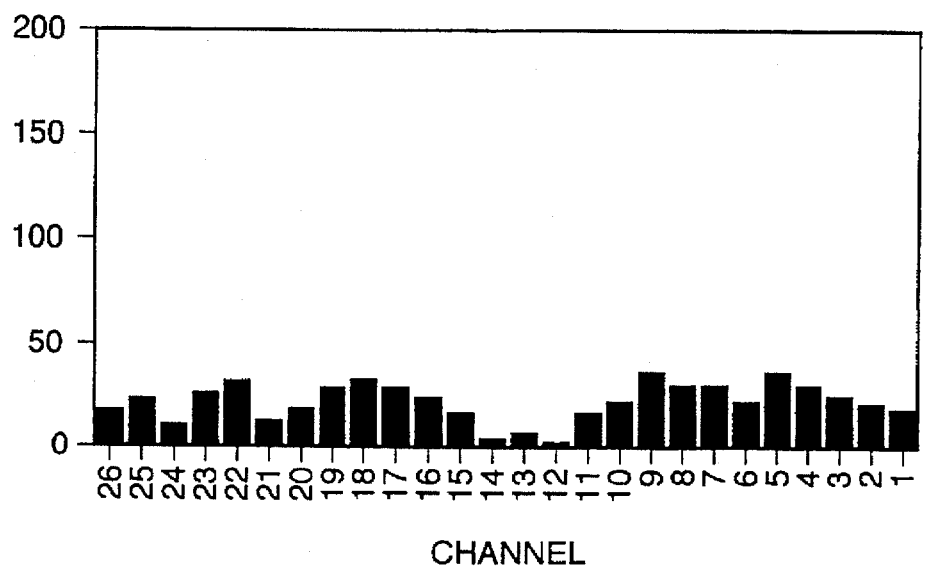
FIG. 4 is a diagram showing an example of data representing relive stretching ratios in the first embodiment.

FIG. 3 is a block diagram showing a control function for form control and a flow of processing data according to a first embodiment of the present invention relating to the feedback control. As shown in FIG. 3, tensions detected by a form detector 28 are input to a form data processing mechanism 32, in which the detected tension are converted to data representing relative stretching ratios. FIG. 4 shows an example of data of the relative stretching ratios obtained from tensions which were actually measured. The relative stretching ratios represent stretching amounts in the longitudinal direction (i.e. in the direction of rolling) of the strip which are measured at different positions in the widthwise direction of the strip, and are converted using the smallest stretching amount as a reference. This relative stretching ratio and the measuring method therefor are described in the "Theory and Practice of Flat Rolling" (The Iron and Steel Institute of Japan, p 265-, published on Sep. 1, 1984).

In FIG. 4, the axis of abscissa corresponds to the widthwise direction of the strip, and also corresponds to detection channels of the form detector 28. The axis ordinate represents relative stretching ratio using a unit "[I-unit]". 1[I-unit] corresponds to a relative stretching ratio of 10 µm per 1 m of strip.

Figure 5:
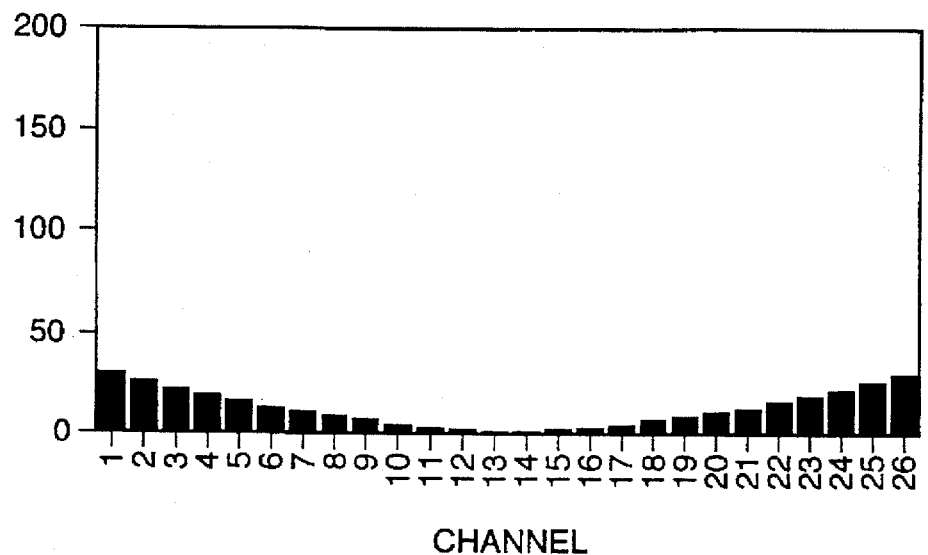
FIG. 5 is a diagram showing an example of a target form in the first embodiment.

A target form of the strip (which is represented by the distribution of target relative stretching ratios in the widthwise direction) is set in a target form generating mechanism 34, and is input to the form error calculating mechanism 36. FIG. 5 shows an example of a target form. The form error calculating mechanism 36 inputs actual form data (which correspond to the data of relative stretching ratios shown in FIG. 4) from the form data processing mechanism 32, and the target form data from the target form generating mechanism 34, and calculates a form error (="target form data"–"actual form data").

Figure 6A:
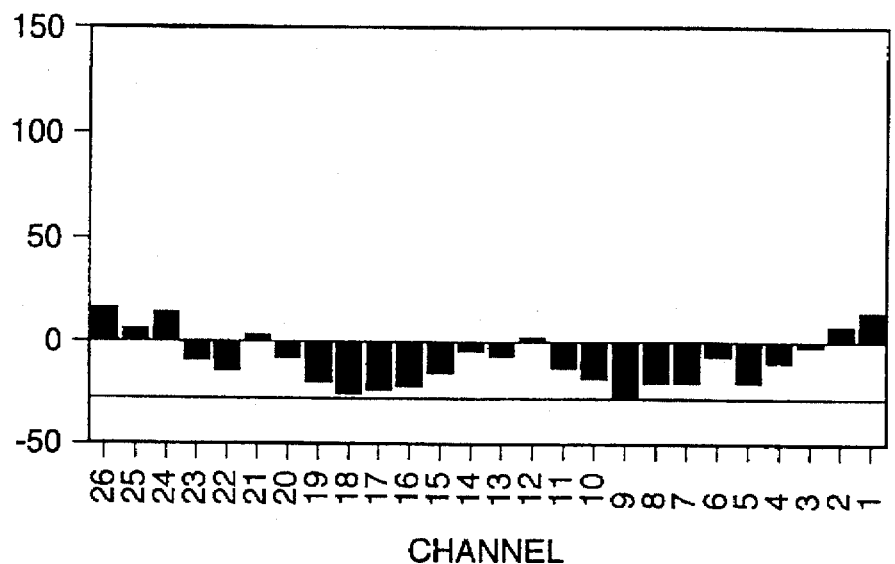
FIG. 6A is a diagram showing an example of a set of form errors in respective channels in the first embodiment.
Figure 6B:
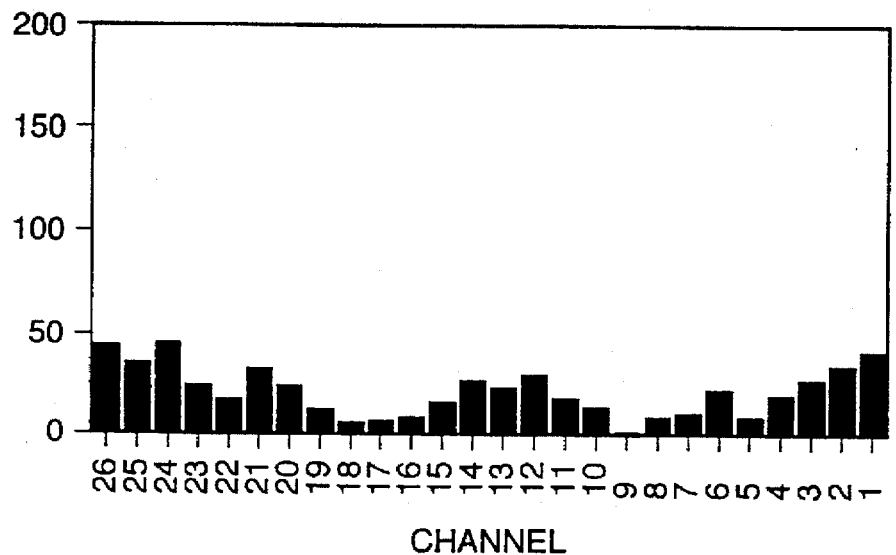
FIG. 6B is a diagram showing converted data obtained by normalizing the data shown in FIG. 6A using the smallest relative stretching amount as a reference.

FIGS. 6A and 6B show form errors in the respective detection channels. The form errors represent the difference between the actual form data of FIG. 4 measured by the form detector 28 and the target form shown in FIG. 5. In other words, the form errors represent the difference in the distribution of relative stretching ratios. FIG. 6A shows the results obtained by simply subtracting the actual form data from the target form data, and FIG. 6B shows form errors obtained by converting the data shown in FIG. 6A such that the smallest relative stretching amount in FIG. 6A (the amount in the 9-th channel in this example) becomes a reference value, i.e., becomes zero.

Figure 7:
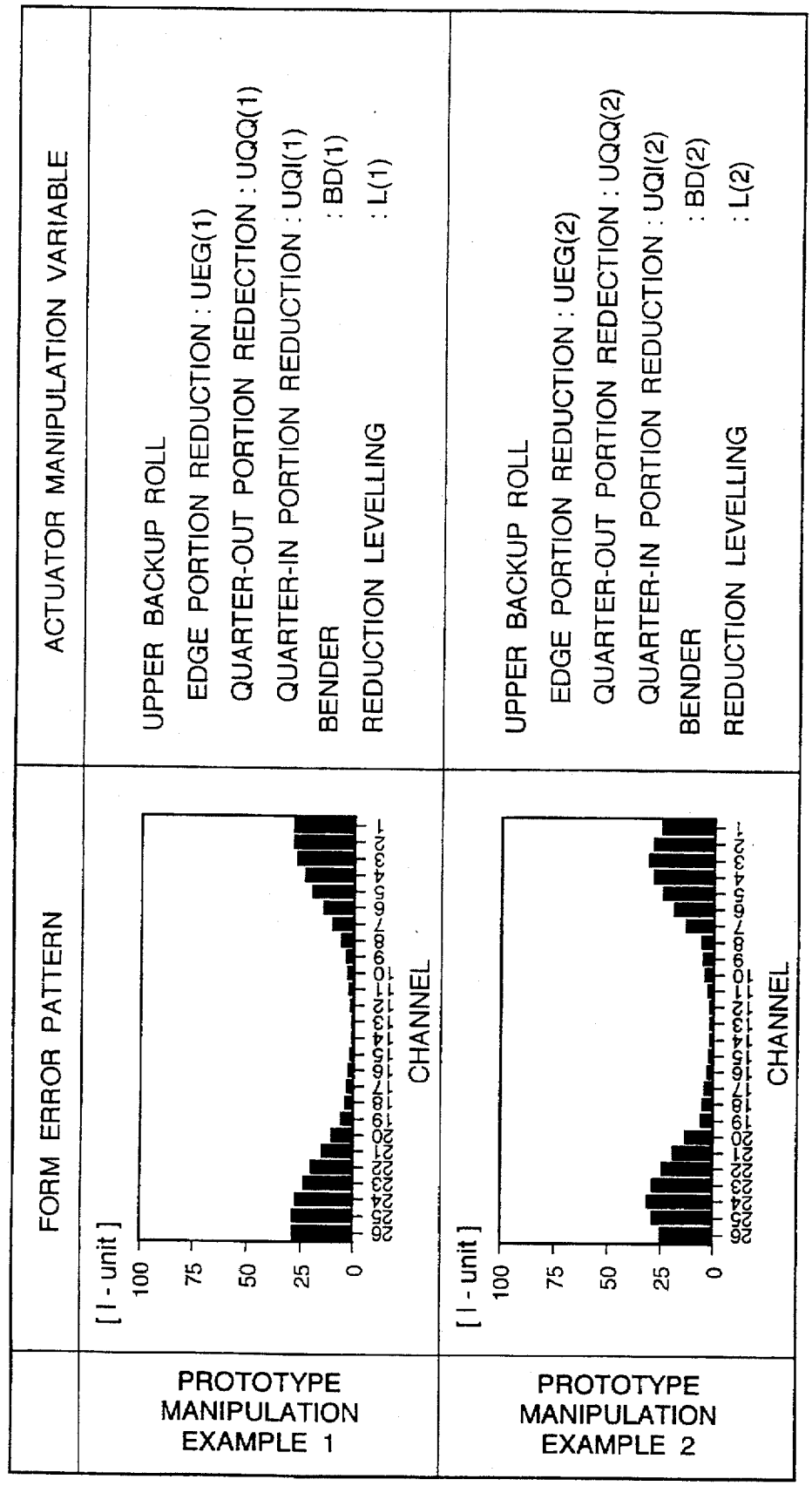
FIG. 7 is an explanatory chart showing prototype manipulation examples 1 and 2 in the first embodiment.
Figure 8:
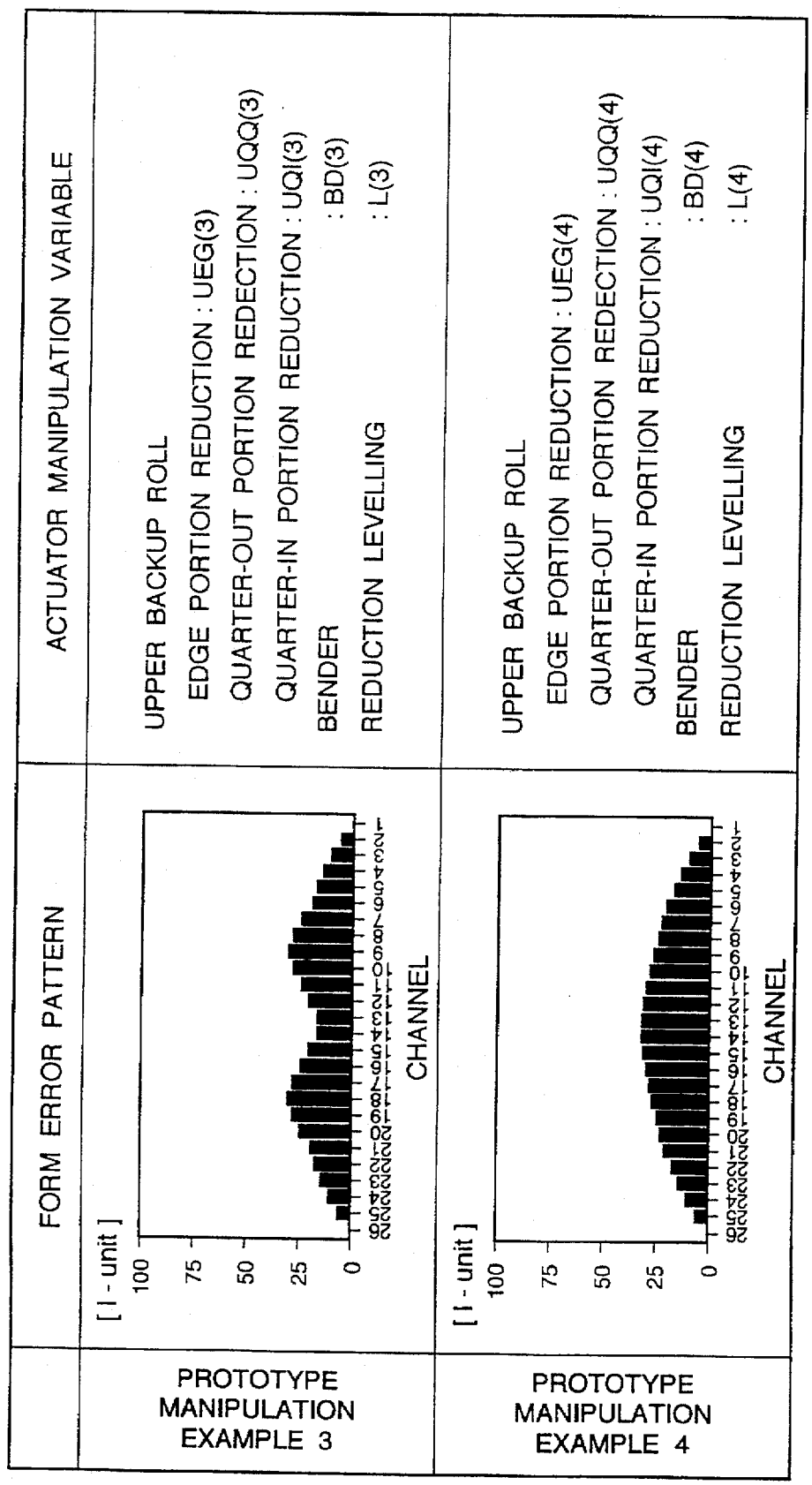
FIG. 8 is an explanatory chart showing prototype manipulation examples 3 and 4 in the first embodiment.
Figure 9:
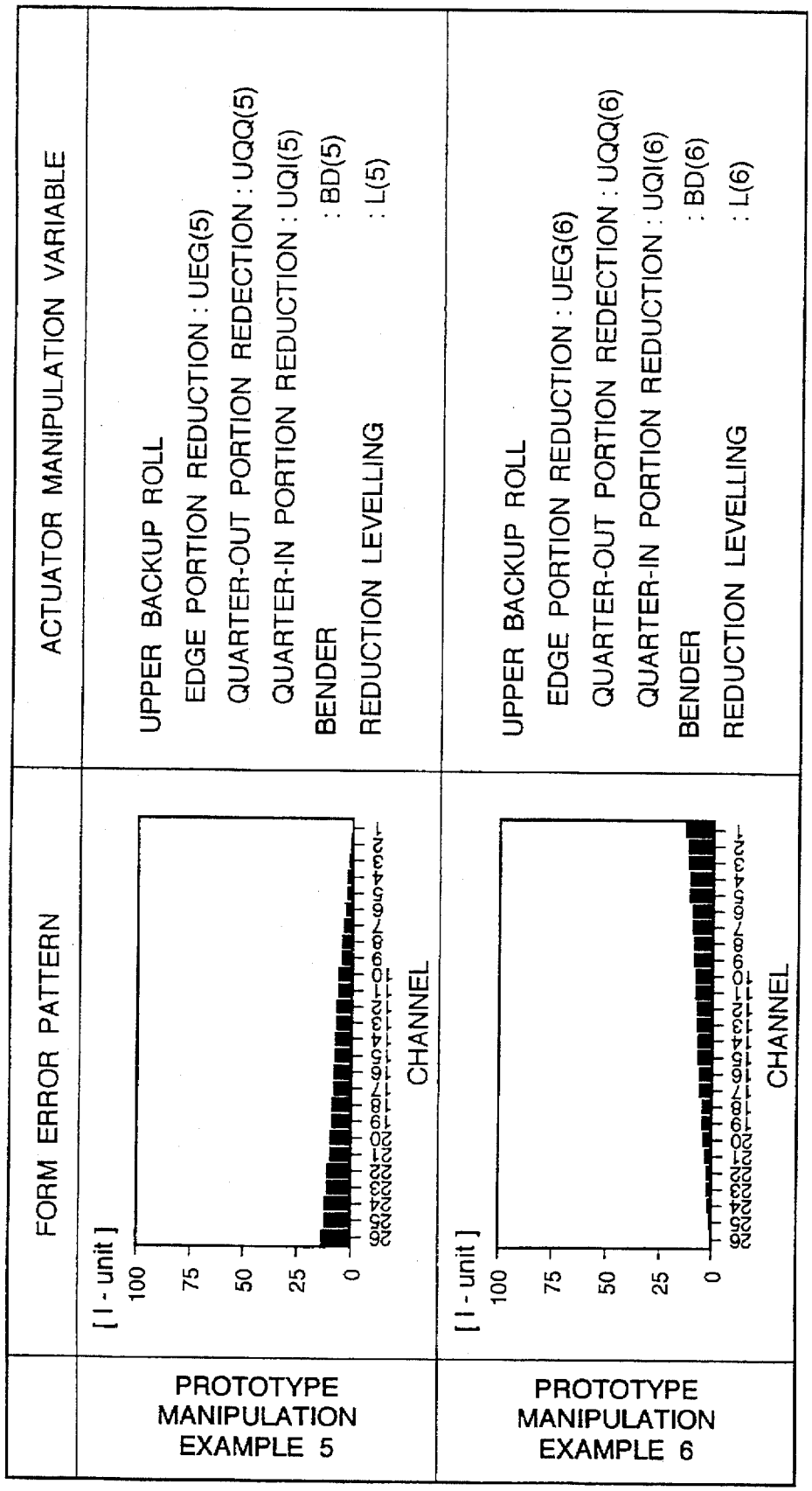
FIG. 9 is an explanatory chart showing prototype manipulation examples 5 and 6 in the first embodiment.

A prototype manipulation example storage mechanism 38 stores a plurality of prototype manipulation examples. Each example includes paired data of manipulation amounts of form control actuators and variation in the form of the strip corresponding to the manipulation amounts. FIGS. 7–9 show six prototype manipulation examples. Each of these prototype manipulation examples includes a form error pattern and manipulation amounts of the actuators corresponding thereto.

A pattern perceiving mechanism 40 calculates the similarity of the form error, which has been calculated by the form error calculating mechanism 36 based on the actual form and the target form, to the variations in the form in the prototype manipulation examples. In detail, the degrees of similarity of the form error shown in FIG. 6B to the form error patterns of the prototype manipulation examples 1–6 shown in FIG. 7–9 are represented as R(1)–R(6). Subsequently, a definition is made by the following expressions (1) and (2) such that a larger similarity produces a larger value (x=1 to 6):

$$R(x) = 1/R'(x) \tag{1}$$

$$R'(x) = \sum_{m=1}^{M} (Tm - Fm)^2 \tag{2}$$

wherein

Tm: value of the n-th channel of the form error pattern of a prototype manipulation example (m=1, ..., M), Fm: value of the n-th channel of an actual form variation pattern (m=1, ..., M), x: x-th prototype manipulation example, and M: number of effective channels of the form detector.

As described above, the reciprocal number of the square error in each channel of the form error is used as the degree of similarity in the present embodiment. However, the present invention is not limited thereto, and other values such as a correlation coefficient may be used as the degree of similarity.

An actuator manipulation amount calculation mechanism 42 weights the actuator manipulation amounts of the prototype manipulation example in accordance with the degree of similarity calculated by the pattern perceiving mechanism 40 so as to obtain actuator manipulation amounts. That is, the manipulation amounts of the respective actuators are calculated as follows:

$$UEG = \sum_{x=1}^{k} R(x) * UEG(x) / \sum_{x=1}^{k} R(x) \tag{3}$$

$$UQO = \sum_{x=1}^{k} R(x) * UQO(x) / \sum_{x=1}^{k} R(x) \tag{4}$$

-continued $$UQI = \sum_{x=1}^{k} R(x) * UQI(x) / \sum_{x=1}^{k} R(x) \qquad (5)$$

$$BD = \sum_{x=1}^{k} R(x) * BD(x) / \sum_{x=1}^{k} R(x) \qquad (6)$$

$$L = \sum_{x=1}^{k} R(x) * L(x) / \sum_{x=1}^{k} R(x) \qquad (7)$$

wherein

UEG: manipulation amount of the edge portion of upper backup rolls,

UQO: manipulation amount of the quarter-out portion of upper backup rolls,

UQI: manipulation amount of the quarter-in portion of upper backup rolls,

BD: manipulation amount of intermediate roll benders,

L: manipulation amount of reduction leveling devices,

UEG(x): manipulation amount of the edge portion of upper backup rolls in the x-th prototype manipulation example (x=1, ..., k)

UQO(x): manipulation amount of the quarter-out portion of upper backup rolls in the x-th prototype manipulation example (x=1, ..., k)

UQI(x): manipulation amount of the quarter-in portion of upper backup rolls in the x-th prototype manipulation example (x=1, ..., k)

BD(x): manipulation amount of intermediate roll benders in the x-th prototype manipulation example (x=1, ..., k) and L(x): manipulation amount of reduction leveling devices in the x-th prototype manipulation example (x=1, ... k).

k: number of prototype manipulation examples (k=6 in the present embodiment).

Actuators 44 are then manipulated in accordance with the manipulation amounts calculated in the above-descried manner.

In the first embodiment, a radius basic function type neural network is used to prepare and maintain the prototype manipulation examples shown in FIGS. 7–9 and to perform calculation using those examples. These procedures will be now described.

Figure 10:
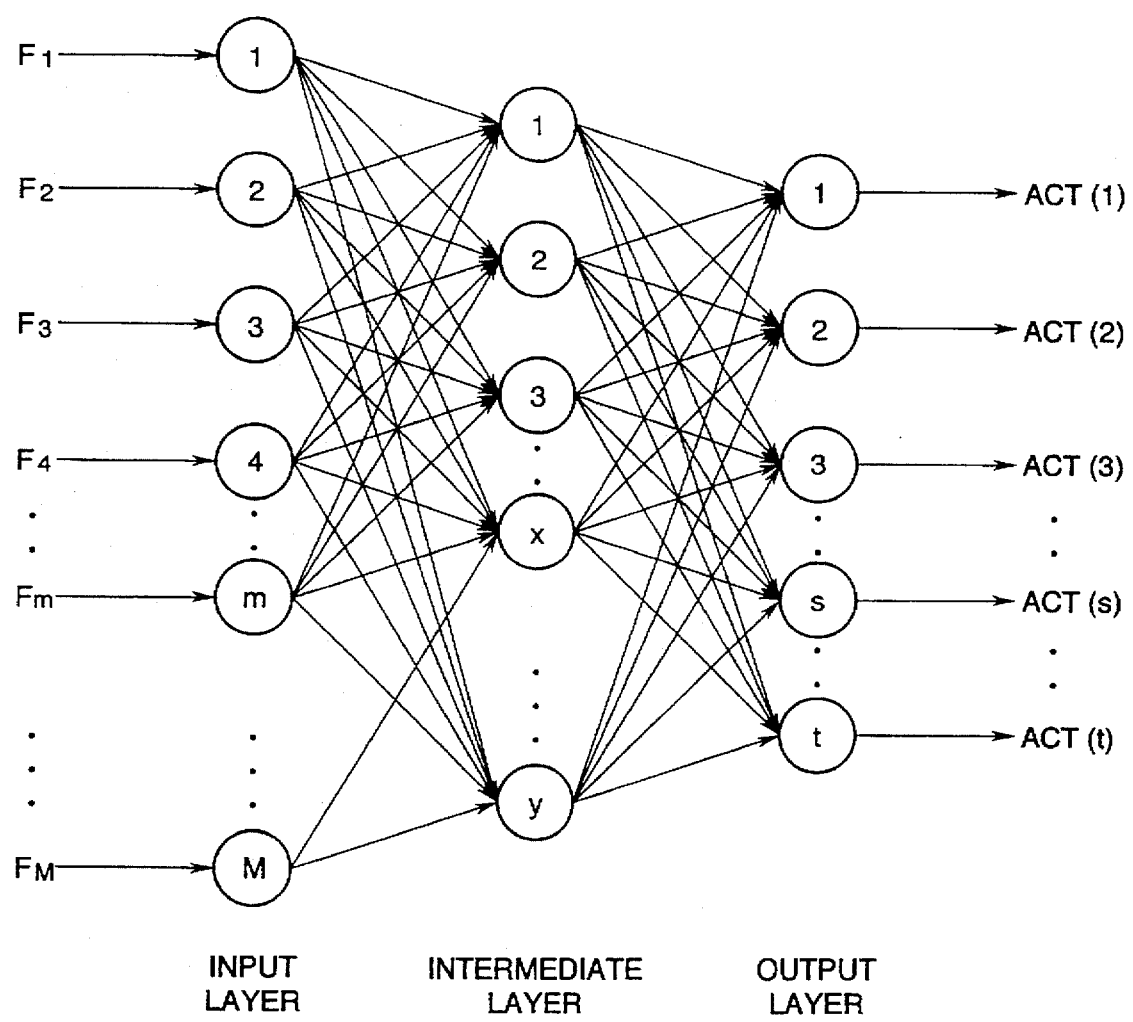
FIG. 10 is an explanatory chart schematically showing the structure of a neural network used in the first embodiment.

FIG. 10 shows the structure of the neural network used in the first embodiment. The neural network has a three-layer structure which is composed of an input layer including m units, an intermediate layer including y units, and an output layer including t units. When an actual form error is input to the input layer, manipulation amounts for the respective actuators are output from the output layer. As will be described later, prototype manipulation examples are input to the intermediate layer.

The method of making the neural network and the method of calculation using the neural network will be described in more detail.

To make the neural network (or perform a learning procedure of the neural network), manipulation amounts of the actuators at the time when rolling operation is actually performed, and amounts of variations in the form at that time are used as form control actual data. When the total number of form control actual data is J, j-th form control actual data Dj (j=1, ..., J) is defined by the following expression (8):

$$Dj = \{ACTj(s), Fjm\}, \qquad (8)$$

wherein

ACTj(s): manipulation amount of the s-th actuator, s: actuator number ($1 < s \leq t$), t: number of actuators, Fjm: amount of variation in the form in the m-th channel in the widthwise direction ($1 < m \leq M$), and M: number of effective channels of the form detector.

Among the data Dj having data elements {ACTj(s), Fjm}, the units of the input layer inputted Fjm are coupled to the units of the intermediate layer (which corresponds to the prototype manipulation examples) in a weighted manner. Also, the units of the intermediate layer are coupled to the units of the output layer outputting ACTj(s) in a weighted manner. The coupling weight between the m-th input unit and the x-th intermediate unit is represented by PFmx, and the coupling weight between the s-th output unit and the x-th intermediate unit is represented by PAxs. These coupling weight coefficients correspond to the attributive values (values of a form error pattern and manipulation amounts of the actuators) of the prototype manipulation examples. The whole coupling weights of the x-th prototype manipulation example are expressed as PTx={PFmx, PAxs}. At the input units, input data are subjected to a suitable data conversion such as normalization.

The prototype manipulation examples are prepared by the following steps.

1) Input units are placed in accordance with the dimension of input, and output units are placed in accordance with the dimension of output.

In this example, the number of the input units becomes m, which is the number of channels of the form variation data, and the number of the output units becomes t, which is the number of the actuators.

At the beginning, no intermediate unit is placed. Also, a constant TH is determined. When the value of the constant TH is decreased, many intermediate units are made. On the contrary, when the value of the constant TH is increased, the number of the intermediate units decreases. In this embodiment, the constant TH is determined by a trial-and-error method taking account of calculation time, control performance, and the like.

2) The 1st form control actual data D1 is used as the coupling coefficient P1 of the 1st prototype manipulation example.

$$P1 = D1 \qquad (9)$$

(PFm1=F1m, PA1s=ACT1(s))

Also, a counter C1 for the prototype manipulation example unit P1 is set to 1.

$$C1 = 1$$

3) For the 2nd form control actual data D2, the distance d (D2, PT1) from the prototype manipulation example (intermediate units) 1 is obtained, wherein the distance d is given by the following expression (10):

$$d(Dj, PTx) = \|Dt - PTx\| \qquad (10)$$
$$= \left\{ \sum_{m=1}^{M} (Fmt - PFxm)^2 + \sum_{s=1}^{t} (ACTj(s) - PAjs)^2 \right\}^{1/2}$$

3-a) When d(D2, PT1)>TH

The 2nd form control actual data D2 is used as the coupling coefficient PT2 of the 2nd prototype manipulation example (intermediate units).

$$PT2 = D2 \quad (11)$$

$$(PFm2 = F2m, PA2s = ACT2(s)).$$

Also, a counter C2 for the prototype manipulation example 2 is set to 1.

$$C2 = 1$$

3-b) When $d(D2, PT1) \leq TH$

The coupling coefficient PT1 of the 1st prototype manipulation example is corrected. The corrected prototype manipulation example $PT1_{new}$ is expressed as follows:

$$PT1_{new} = (C1*PT1 + D2)/(C1+1) \quad (12)$$

$$(PFm1_{new} = (C1*PFm1 + D2)/(C1+1),$$

$$PA1s_{new} = (C1*PA1s + D2)/(C1+1))$$

Also, 1 is added to the counter C1 for the prototype manipulation example unit P1.

$$C1_{new} = C1 + 1$$

4) Similarly, for the j-th form control actual data Dj, the distances from the intermediate units which have been made up to the present are obtained, and a prototype manipulation example PTk which has the smallest distance is selected.

4-a) When $d(Dj, PT_k) > TH$

The j-th form control actual data Dj is used as the coupling coefficient $PT_{k+1}$ of the (k+1)-th prototype manipulation example.

$$PT_{k+1} = Dj \quad (13)$$

$$(PFm_{k+1} = Fkm, PA_{k+1}s = ACT_k(s))$$

Also, a counter $C_{k+1}$ for the prototype manipulation example unit $PT_{k+1}$ is set to 1.

$$C_{k+1} = 1$$

4-b) When $d(Dj, PT_k) \leq TH$

The coupling coefficient of the prototype manipulation example unit PTk is corrected. The corrected prototype manipulation example $PT_{k\ new}$ is expressed as follows:

$$PT_{k\ new} = (C_k \cdot PT_k + Dj)/(C_k + 1) \quad (14)$$

$$(PFm_{k\ new} = (C_k \cdot PFm_k + D2)/(C_k + 1),$$

$$PA_{ks\ new} = (C_k \cdot PA_k s + D2)/(C_k + 1)).$$

Also, 1 is added to the counter $C_k$ for the prototype manipulation example unit $P_k$.

$$C_{k\ new} = C_k + 1$$

5) By carrying out the above-described processing for all the form control actual data $\{Dj \parallel 1 < j \leq J\}$, y prototype manipulation examples (intermediate units) are generated.

Since the coupling coefficients of the prototype manipulation example units correspond to the attributive values (the values of the form error pattern and the manipulation amounts of the actuators) of the prototype manipulation examples, it means that y prototype manipulation examples have been extracted. When the x-th data among the y prototype manipulation examples is represented by PTx, the PTx can be expressed by the following expression (15):

$$PTx = \{PFmx, PAxs\} \quad (15)$$

wherein

PAxs: coupling weight between the x-th intermediate unit and the s-th output unit (the manipulation amount of the s-th actuator in the x-th prototype manipulation example), and PFmx: coupling weight between the m-th input unit and the x-th intermediate unit (the amount of variation in form in m-th channel in the widthwise direction in the x-th prototype manipulation example).

In other words, it means that when the s-th actuator is manipulated by PAxs, the amount of variation in the m-th channel becomes PFmx.

Next, the description is given of the method for calculating the manipulation amounts of actuators from an actual form error which is obtained during rolling operation. In this calculation, the degree of similarity between the actual form error and the form error data of each prototype manipulation example is obtained, and the manipulation amounts of the actuators are calculated based on the degree of similarity.

The difference between the actual form detected by the form detector 28 during rolling operation and a preset target form is defined as an actual form error Fm. As shown in FIG. 10, the actual form error Fm is input to the input units of the neural network so as to calculate input IPx for the x-th intermediate unit in accordance with the following expression (16):

$$IPx = \left\{ \sum_{m=1}^{M} (FPmx - Fm)^2 \right\}^{1/2} \quad (16)$$

wherein

PFmx: coupling weight between the m-th input unit and the x-th intermediate unit (the amount of variation in form in m-th channel in the widthwise direction in the x-th prototype manipulation example).

Fm: value of the m-th channel of the actual form error pattern, x: x-th prototype manipulation example (intermediate unit), and M: number of effective channels of the form detector.

As an input-output function used in the intermediate units, the Gaussian function given by the following expression (17) is used:

$$f(x) = \exp(-x^2/2\sigma^2) \quad (17)$$

wherein σ is a constant.

Accordingly, the output value OPx from the x-th intermediate unit can be represented by the following expression (18):

$$OPx = f(IPx) \quad (18)$$

The OPx corresponds to the degree of similarity between the intermediate unit (prototype manipulation example) and the input actual form error.

Moreover, the output value ACT(s) from the s-th output unit can be obtained by the following expression (19):

$$ACT(s) = \sum_{x=1}^{Y} (OPx \cdot PAxs) / \sum_{X=1}^{Y} OPx \qquad (19)$$

wherein

PAxs: coupling weight between the x-th intermediate unit and the s-th output unit (the manipulation amount of the s-th actuator in the x-th prototype manipulation example).

By the above-described calculation, the manipulation amount ACT(s) of the s-th actuator can be obtained.

Also, the control performance can be maintained or improved by correcting the prototype manipulation examples (the intermediate units of the neural network) and/or by adding new prototype manipulation examples using the manipulation amounts of the actuators during rolling operation and data representing variations in form due to the manipulations of the actuators.

According to the above-described first embodiment, it becomes possible, by using the neural network, to extract prototype manipulation examples from the actual rolling form data and to perform form control by interpolating the prototype manipulation examples in accordance with the variation in the form during rolling operation. Accordingly, the form control can be properly carried out even in a multistage rolling mill in which the relationship between the variations in form and the manipulations of the actuators is difficult to set.

Next, the second embodiment of the present invention relating to the feedback control will be described.

Figure 11:
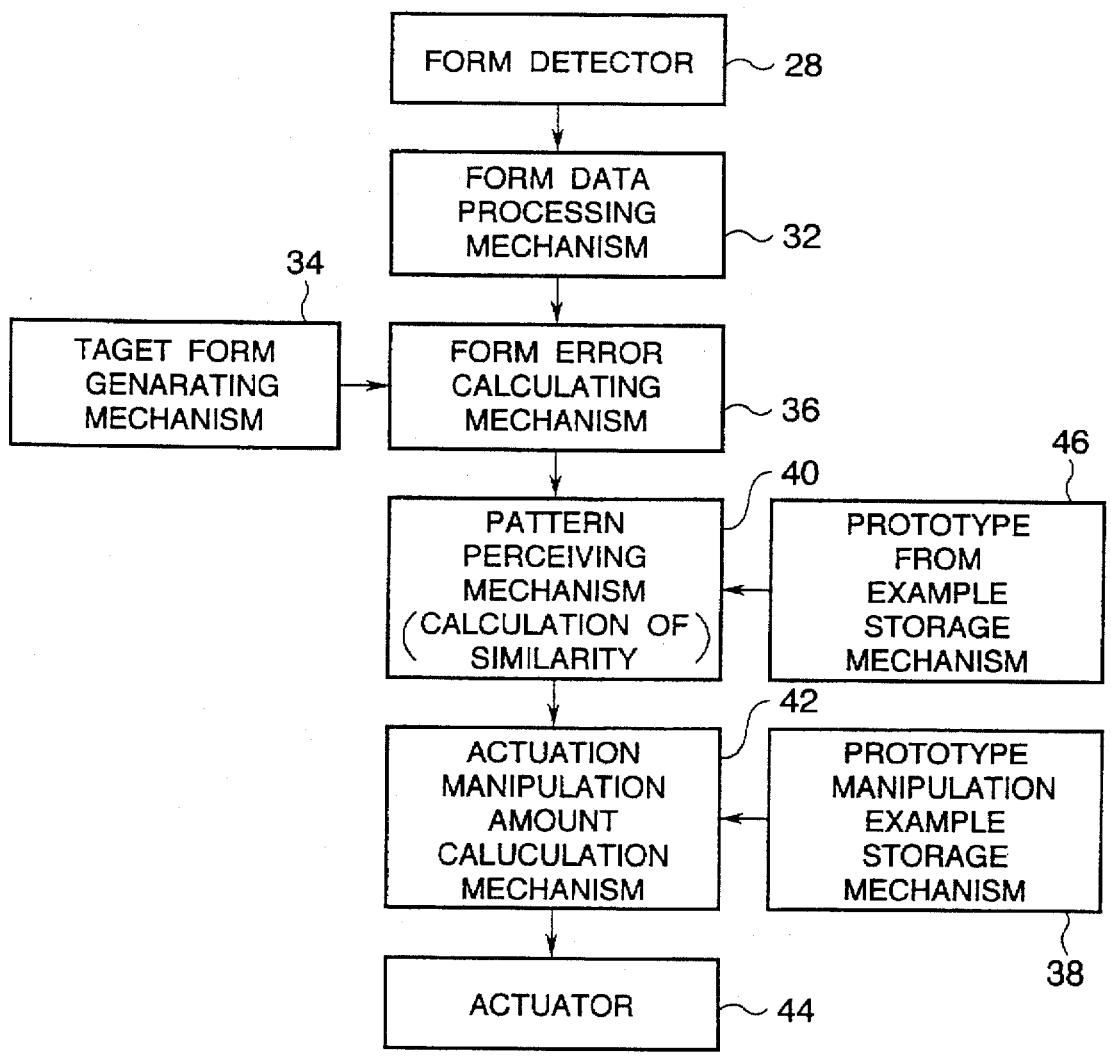
FIG. 11 is a block diagram showing a control mechanism and a flow of processing data according to a second embodiment of the present invention.

FIG. 11 is a block diagram showing a control mechanism and a flow of processing data according to the second embodiment. Description will be made focusing on the points which differ from the first embodiment.

Figure 12:
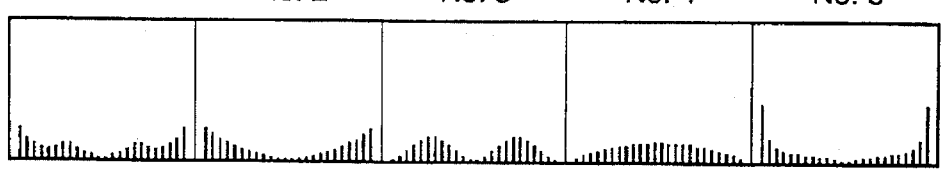
FIG. 12 is a diagram showing twenty standard form patterns used in the second embodiment.
Figure 12:
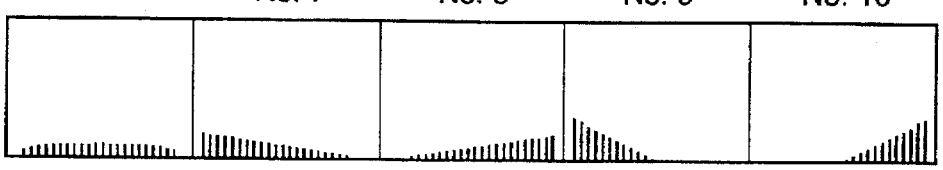
Figure 12:
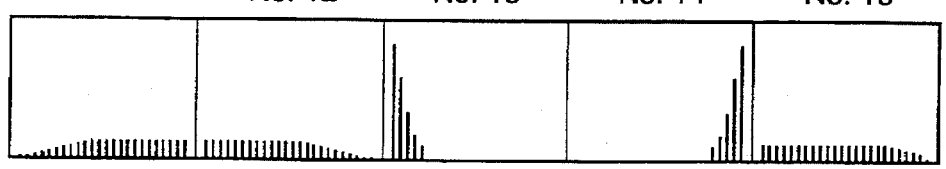
Figure 12:
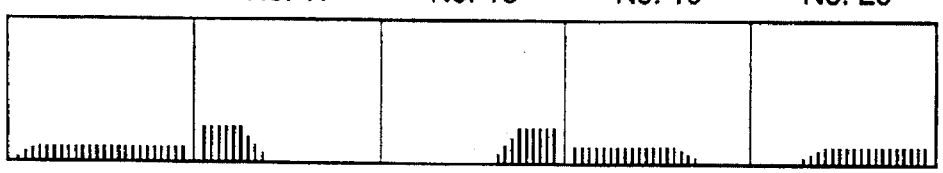

FIG. 12 shows twenty standard form patterns used in the second embodiment. The composition ratio of each standard form pattern is represented by STD(z), wherein z=1, 2, ..., 20.

Figure 13:
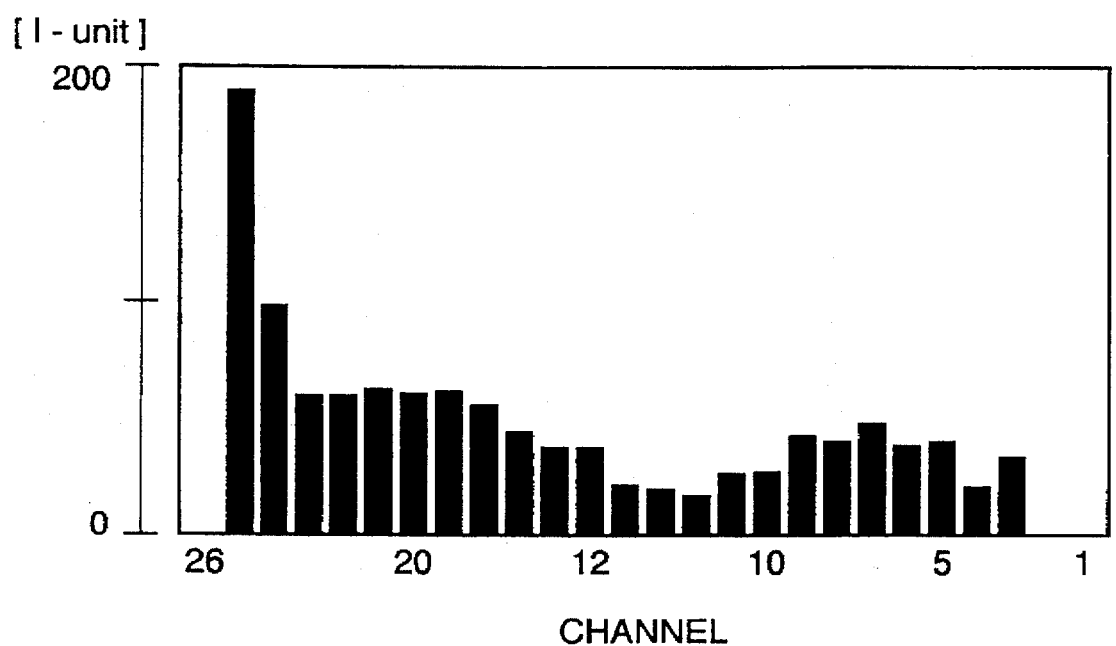
FIG. 13 is a diagram showing an example of a set of form errors in the second embodiment.
Figure 14:
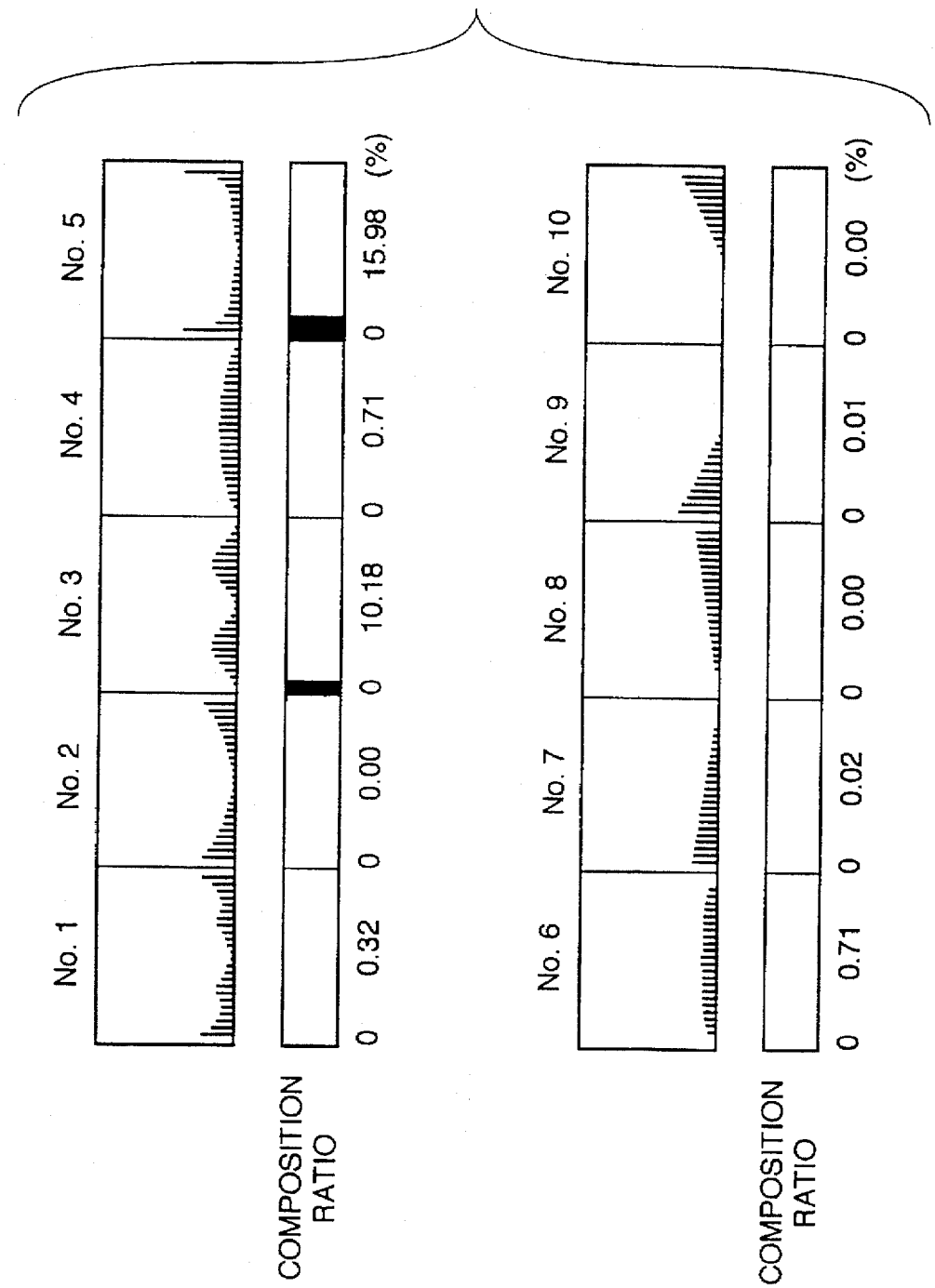
FIG. 14 is an explanatory chart showing a composition ratio classified into standard form patterns in the second embodiment.
Figure 15:
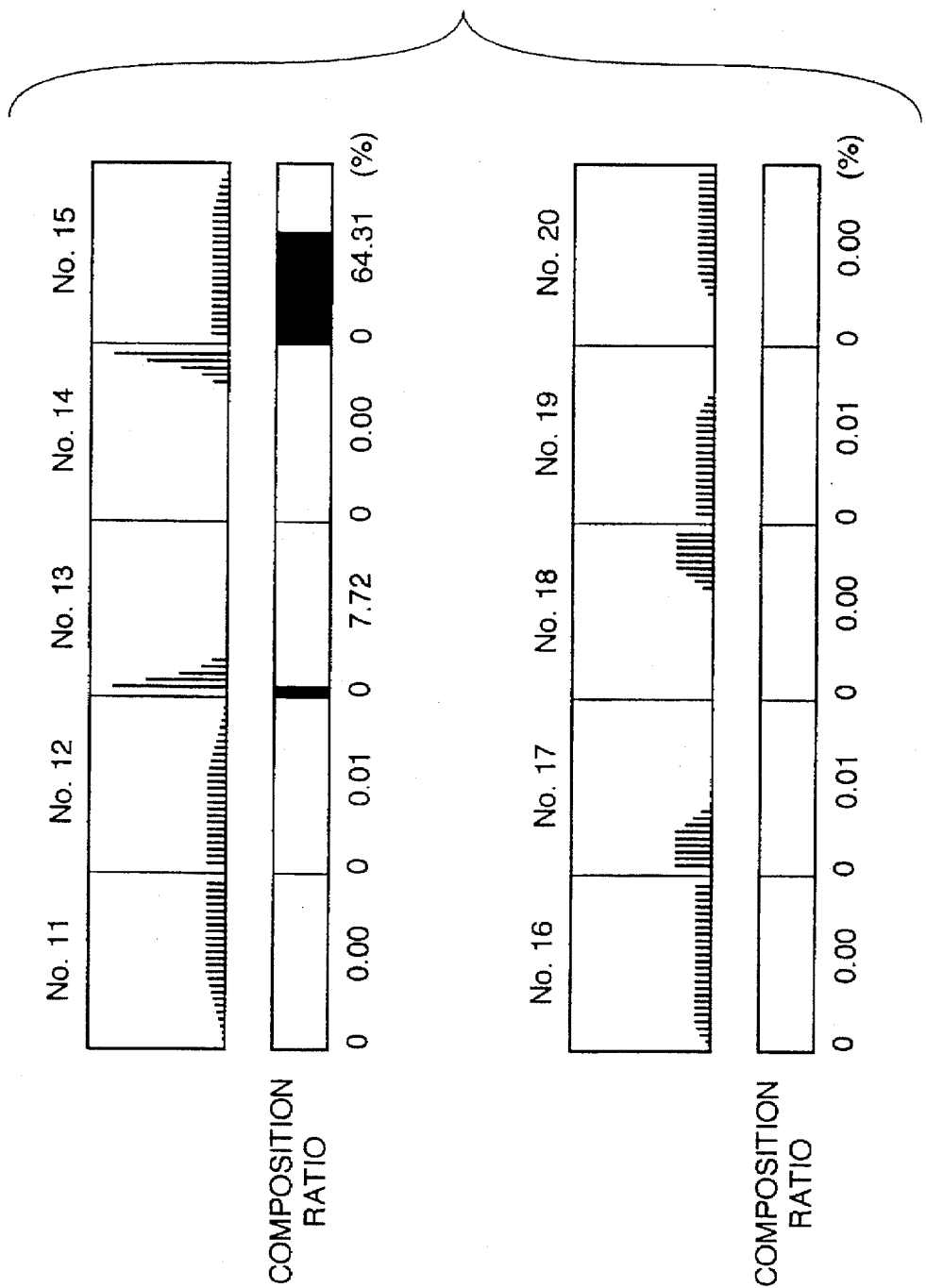
FIG. 15 is another explanatory chart showing a composition ratio classified into standard form patterns in the second embodiment.

In a prototype form example storage mechanism 46, the form variation of a strip and a composition ratio, which is obtained by classifying the form variation into the standard form pattern, are stored as paired data, called a prototype form example. A plurality of prototype form examples are stored. When the form shown in FIG. 13 is classified into the standard form pattern, the composition ratios shown in FIGS. 14 and 15 can be obtained.

The v-th prototype form example is defined by the following expression:

$$v = \{Pvm, STDv(z)\} \qquad (20)$$

wherein

Pvm: form variation amount in the m-th channel (m=1, ..., M),

M: number of effective channels of the form detector.

STDv(z): composition ratio of each standard form pattern in the v-th prototype form example, prototype form example number (v=1, ..., G), G: number of prototype form examples, and z: standard form pattern number (z=1, ..., 20).

In a prototype manipulation example storage mechanism 38, the manipulation amounts of the actuators during rolling operation and a corresponding composition ratio, which is obtained by classifying the amounts of variations in form into the standard form pattern as shown in FIG. 12, are stored as paired data, called a prototype manipulation example. A plurality of prototype manipulation examples are stored.

The variation in form at the time when the s-th actuator is manipulated by the manipulation amount ACT(s) is classified into the standard form patterns to obtain a composition ratio STD (z) for each pattern in the above-described manner. Then, the w-th prototype manipulation example is defined by the following expression (21):

$$w = \{ACTw(s), STDw(z)\} \qquad (21)$$

wherein

ATCw(s): manipulation amount of the actuator in the w-th prototype manipulation example, STDw(z): composition ratio of each standard form pattern in the w-th prototype manipulation example, w: prototype manipulation example number (w=1, ..., H), H: number of prototype manipulation examples, and z: standard form pattern number (z=1, ..., 20).

In a pattern perceiving mechanism 40, like in the first embodiment, the difference between the actual form calculated by a form error calculating mechanism 36 and a target form input from a target form generating mechanism 34 is calculated. Also, the degree of similarity of the actual form error to the amount of variation in the prototype manipulation example is calculated. The degree of similarity between the above-described actual form error and the form error pattern of the v-th prototype form example is represented by R1(v). This R1(v) is defined such that it takes a larger value when the degree of similarity becomes higher. Then, the composition ratios of the prototype form examples are weighted in accordance with the calculated degree of similarity. The composition ratio WSTDv(z) of the z-th weighted form pattern is represented by the following expression (22):

$$WSTDv(z) = \sum_{v=1}^{G} R1(v) \cdot STDv(z) / \sum_{v=1}^{G} R1(v) \qquad (22)$$

Next, the degree of similarity between the weighted composition ratio WSTDv(z) and the composition ratio of the prototype manipulation example is calculated. The degree of similarity between the weighted composition ratio WSTDv(z) of the prototype form example and the composition ratio STDw(z) of the w-th prototype manipulation example is represented by R2(w). This R2(w) is defined such that it takes a larger value when the degree of similarity becomes higher. Then, the manipulation amount ACTw(s) of the s-th actuator of the prototype manipulation example is weighted in accordance with the calculated degree of similarity. Then, the manipulation amount ACT(s) of the s-th actuator is calculated by the following expression (23):

$$ACT(s) = \sum_{w=1}^{H} R2(w) \cdot ACTw(s) / \sum_{w=1}^{H} R2(w). \qquad (23)$$

Like the first embodiment, the actuators are manipulated based on the manipulation amounts which have been calculated in the above-described manner to control the form of the strip.

Also, the preparation, maintenance and calculation of the prototype form examples and the prototype manipulation examples are carried out using a radius basic function type neural network. Moreover, the prototype manipulation examples (the intermediate units of the neural network) are corrected and/or new prototype manipulation examples are added by using the manipulation amounts of the actuators during rolling operation and data representing variations in form due to the manipulations of the actuators.

Next, a third embodiment of the present invention relating to the initial setting will be described.

Figure 16:
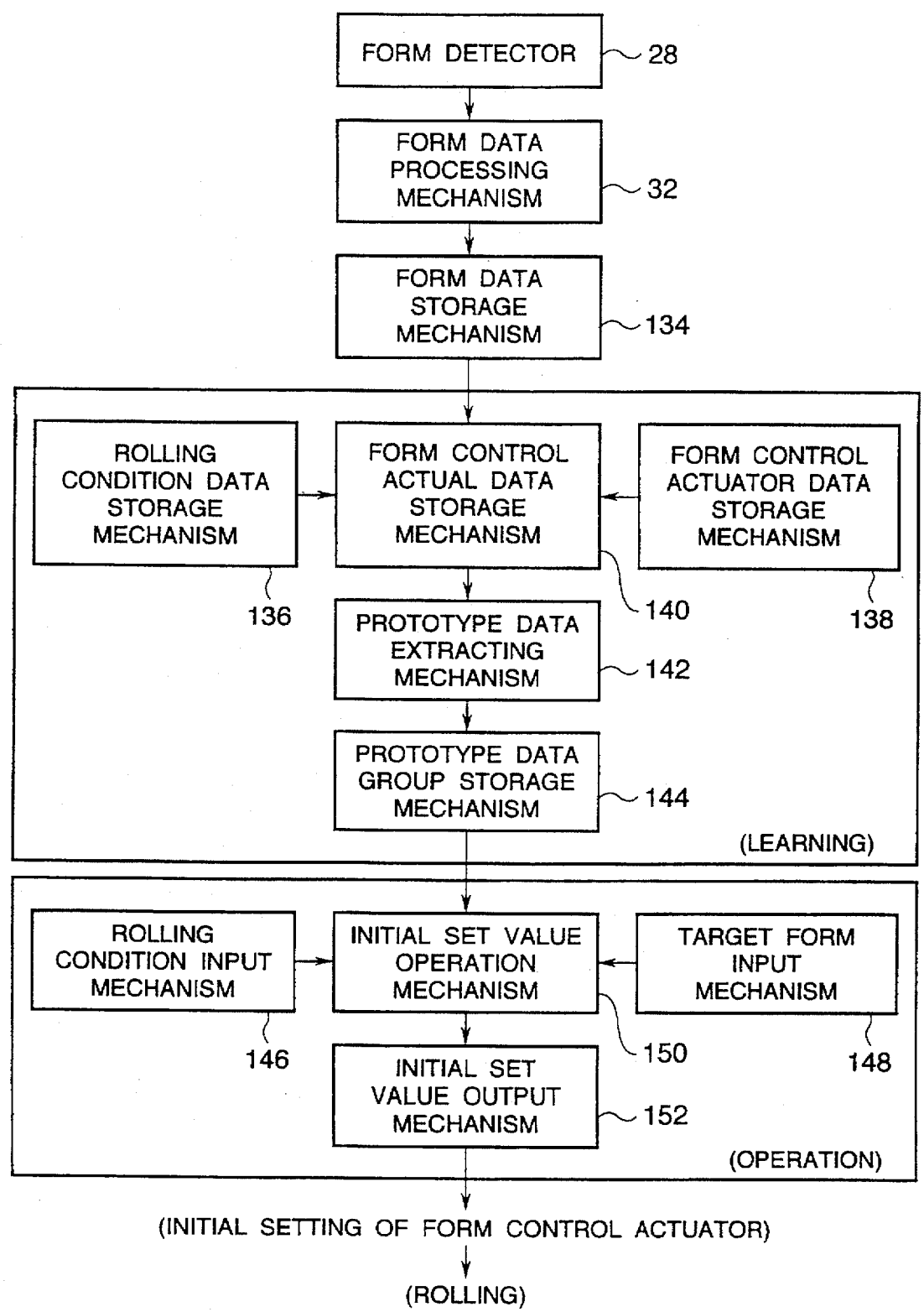
FIG. 16 is a block diagram showing a flow of data in an initial setting procedure for form control in a third embodiment of the present invention.

FIG. 16 is a block diagram showing a flow of data in an initial setting procedure for form control in the third embodiment. The output of a form detector 28 is processed by a form data processing mechanism 32 so that it is converted into form data (a form index). The form data are stored in a form data storage mechanism 134 at an arbitrary timing. In this embodiment, the stretching ratio distribution in the widthwise direction of a strip (the width of the strip is divided into M channels (1<M) is used as the form data).

Similarly, rolling condition data are stored in a rolling condition data storage mechanism 136, and form control actuator data are stored in a form control actuator date storage mechanism 138. In this embodiment, the rolling conditions include the width of a strip, a predicted rolling load, and the diameter of work rolls. Further, the kind of steel, information on the preceding stage, a target thickness of a product, the temperature at the entrance side, a target temperature at the exit side, etc., can be added as the rolling conditions. In this embodiment, the edge positions of upper backup rolls, the quarter-out positions of the upper backup rolls, the quarter-in positions of the upper backup rolls, the edge positions of lower backup rolls, the quarter portions of the lower backup rolls, and bending values of intermediate roll benders are used as form manipulation variables. In each of the divided backup rolls, the center is used as a reference.

In a form control actual data storage mechanism 140, the rolling condition data, the form control actuator data, and the form data corresponding to those data, which are input from the rolling condition data storage mechanism 136, the form control actuator data storage mechanism 138 and the form data storage mechanism 134, respectively, are combined. The combined data are then stored therein as form control actual data. In a prototype data extracting mechanism 142, prototype (typical data) is extracted which represents the distribution of those data based on the form control actual data. The prototype data thus obtained are stored in the prototype data group storage mechanisms 144. The procedure from the accumulation of the above-mentioned data to the extraction of prototype data will be referred to as "LEARNING" hereinafter. The LEARNING can be performed at any time if sufficient data have been collected.

A rolling condition input mechanism 146 and a target form input mechanism 148 are used to supply an initial set value operation mechanism 150 with rolling condition data and target form data (desired form) of the next material to be rolled. The initial set value operation mechanism 150 obtains the degree of similarity of the rolling condition data and the target form data to all the prototype data stored in the prototype data group storage mechanism 144, and composes the set values for the form control actuators, which are contained in the prototype data, in accordance with the degree of similarity so as to obtain initial set values for the input rolling condition data and the target form data, i.e., for the next material to be rolled. An initial set value output mechanism 152 outputs the calculated initial set values for the form control actuators. These mechanisms will be referred to as "OPERATION" as a whole.

Subsequently, the form control actuators are subjected to an initial setting procedure in accordance with the values output from the initial set value output mechanism 152. Then, rolling of the next material is started.

Figure 17:
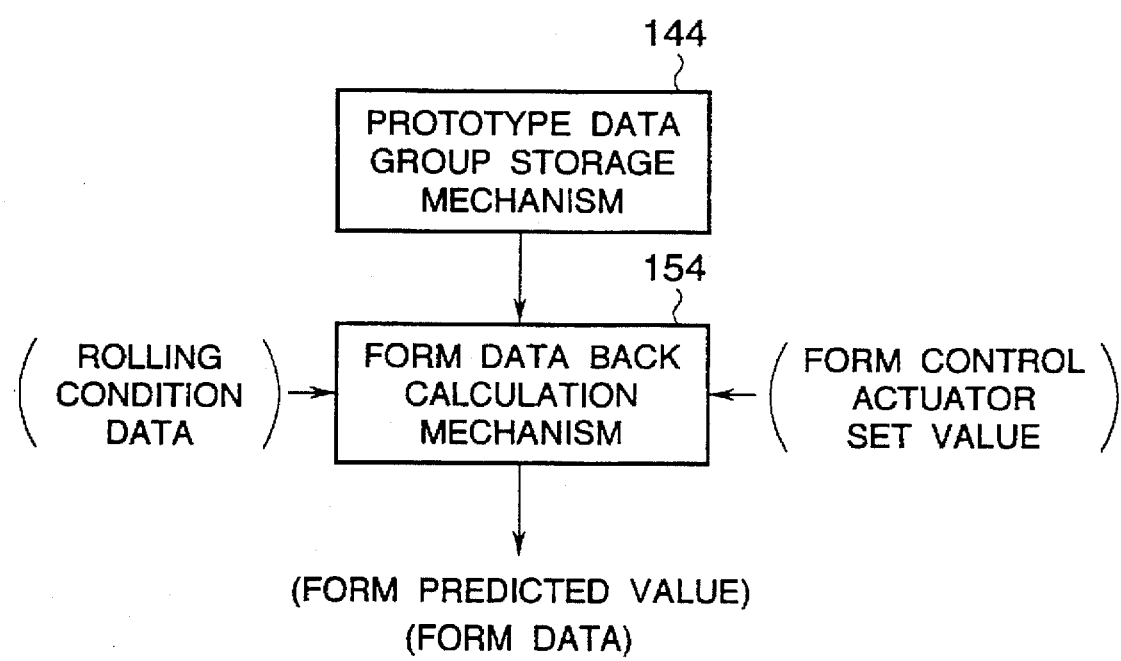
FIG. 17 is a block diagram showing a flow of data at the time when form predicting values are obtained from rolling condition data and set values for form control actuators in the third embodiment.

FIG. 17 is a block diagram showing a flow of data at the time when form predicting values are obtained from the rolling condition data and set values for the form control actuators. A form data back calculation mechanism 154 obtains the degree of similarity of the rolling condition data and the set values for the form control actuators to the rolling condition data and the set values for the form control actuators in the prototype data stored in the prototype data group storage mechanism 144. The form data back calculation mechanism 154 then calculates form data according to the degree of similarity. The form data correspond to a predicted form which will be obtained by a rolling operation in which the above-described rolling condition data and set values for the form control actuators are used.

Next, "LEARNING" and "OPERATION" will be described in more detail.

When the total number of the form control actual data is J, the j-th form control actual data Dj can be defined by the following expression (24):

$$Dj = \{Smj, A1j, A2j, A3j, B1j, B2j, B3j, B4, B5j, B6j\} \quad (24)$$

wherein the respective variables have the following meaning:
(form data)
  Smj: relative stretching ratio in the m-th cannel in the widthwise direction of the strup (m=1, ..., M),
  M: number of effective channels of the form detector,
(rolling condition data)
  A1j: width of the strip,
  A2j: predicted rolling load,
  A3j: diameter of work rolls,
(set values for the form control actuators)
  B1j: edge positions of the upper backup rolls,
  B2j: quarter-out positions of the upper backup rolls,
  B3j: quarter-in positions of the upper backup rolls,
  B4j: edge positions of the lower backup rolls,
  B5j: quarter portions of the lower backup rolls, and
  B6j: bending values of the intermediate roll benders.

Figure 18:
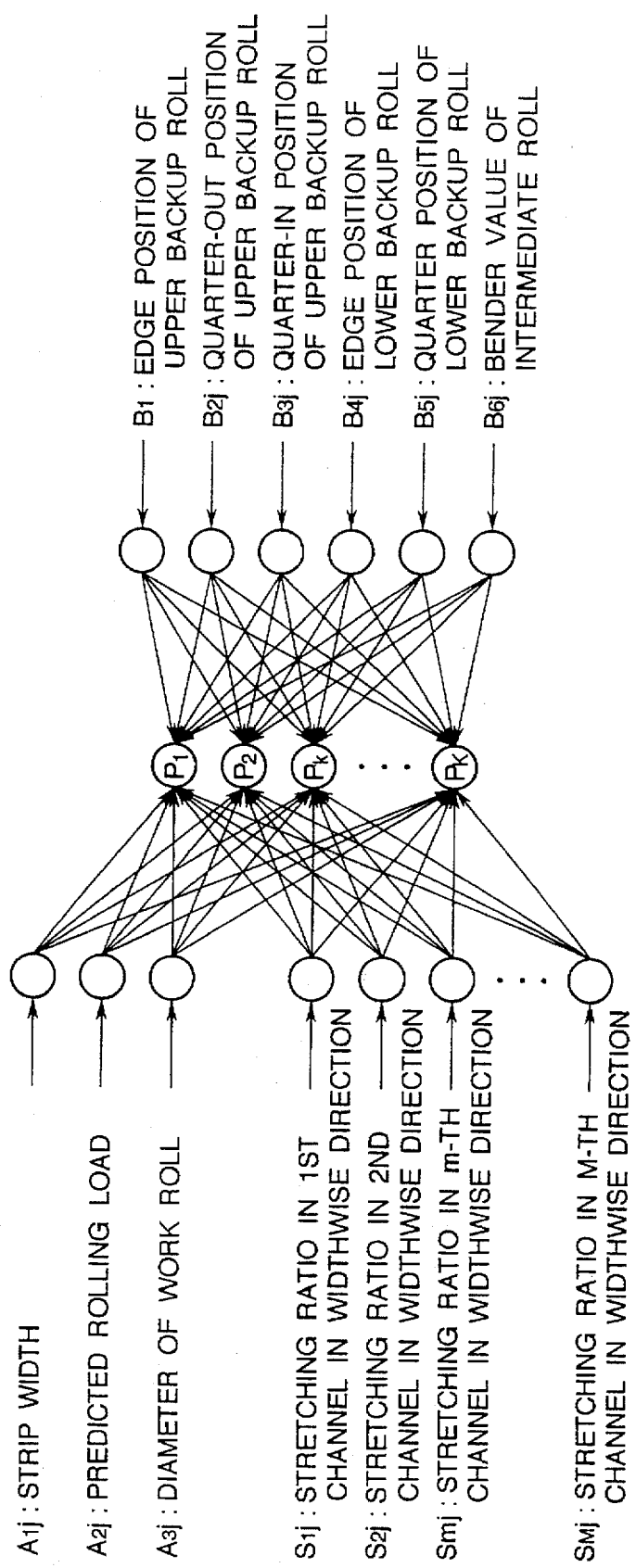
FIG. 18 is a diagram of a network showing an example of a procedure for "LEARNING" in the third embodiment.

The prototype data extracting mechanism 142 uses the form control actual data $\{Dj \mid 1<j\leq J\}$ to extract prototype (typical data) which represent the distribution of the form control actual data. The procedure for LEARNING can be expressed by the network shown in FIG. 18. That is, there exist input units and prototype units which correspond to prototype data. The elements {Smj, A1j, A2j, A3j, B1j, B2j, B3j, B4j, B5j, B6j} of Dj are input into the input units. Each of the prototype units is coupled with each of the input unit in a weighted manner. The coupling coefficient (weight) between a prototype unit Pk and the input units {Sm, A1, A2, A3, B1, B2, B3, B4, B5, B6} are represented by {PSmk, PA1k, PA2k, PA3k, PB1k, PB2k, PB3k, PB4k, PB5k, PB6k}. The coupling coefficients correspond to the attributive values of the prototype data. Accordingly, the extraction of prototype data is performed by making prototype units. At the input units, input data are subjected to a suitable data conversion such as normalization.

The prototype units are made as follows:
(1) Input units are placed in accordance with the dimension of input. In this example, the number of the input units becomes (9+M), because the number of rolling conditions is 3, the number of form data is M, and the number of the form control actuators is 6. At the beginning, no prototype unit is placed. Also, a constant TH is determined.
(2) The 1st form control actual data D1 is used as the coupling coefficient P1 of the 1st prototype unit. Also, a counter C1 for the prototype unit P1 is set to 1.

$$P1 = D1$$

That is, $$\{PSm1, PA11, PA21, PA31, PB11, PB21, PB31, PB41, PB51, PB61\} = \{Sm1, A11, A21, A31, B11, B21, B31, B41, B51, B61\}.$$

$$C1 = 1$$

(3) For the 2nd form control actual data D2, the distance d (D2, P1) from the prototype unit P1 is obtained, wherein the distance d is given by the following expression (25):

$$\begin{aligned}d(Dt, Pu) &= \|Dt - Pu\| \quad (25) \\ &= \Big\{ \sum_{m=1}^{M} (Smt - PSmu)^2 + (A1t - PA1t)^2 + \\ &\quad (A2t - PA2u)^2 + (A3t - PA3u)^2 + \\ &\quad (B1t - PB1u)^2 + (B2t - PB2u)^2 + \\ &\quad (B3t - PB3u)^2 + (B4t - PB4u)^2 + \\ &\quad (B5t - PB5u)^2 + (B6t - PB6u)^2 \Big\}^{1/2}\end{aligned}$$

(3-a) When d(D2, P1)>TH

The 2nd form control actual data D2 is used as the coupling coefficient P2 of the 2nd prototype unit. Also, a counter C2 for the prototype unit P2 is set to 1.

$$P2 = D2$$

$$C2 = 1$$

(3-b) When d(D2, PT1)≤TH

The coupling coefficient P1 of the 1st prototype is corrected. The corrected prototype $P1_{new}$ is expressed as follows:

$$P1_{new} = (C1 \cdot P1 + D2)/(C1+1).$$

Also, 1 is added to the counter C1 for the prototype unit P1.

$$C1_{new} = C1+1$$

(4) Similarly, for the j-th form control actual data Dj, the distances from all the prototype units which have been made up to the present are obtained, and a prototype unit Pk which has the smallest distance is selected.

(4-a) When d (Dj, $P_k$)>TH

The j-th form control actual data Dj is used as the coupling coefficient $P_{k+1}$ of the (k+1)-th prototype unit. Also, a counter $C_{k+1}$ for the prototype unit $P_{k+1}$ is set to 1.

$$P_{k+1} = Dj$$

$$C_{k+1} = 1$$

(4-b) When d(Dj, $P_k$)≤TH

The coupling coefficient of the prototype unit $P_k$ is corrected. The corrected prototype unit $P_{k\,new}$ is expressed as follows:

$$P_{k\,new} = (C_k \cdot P_k + Dj)/(C_k+1).$$

Also, 1 is added to the counter $C_k$ for the prototype unit $P_k$.

$$C_{k\,new} = C_k+1$$

5) By carrying out the above-described processing for all the form control actual data {Dj | 1<j≦J}, k prototype units are generated.

Since the coupling coefficients of the prototype units correspond to the attributive values of the prototype data, it means that k prototype data have been extracted. When the k-th data among the K prototype data is represented by Pk, the Pk is expressed by the following expression (26):

$$Pk = \{PSmk, PA1k, PA2k, PA3k, PB1k, PB2k, PB3k, PB4k, PB5k, PB6k\}, \quad (26).$$

wherein the respective variables have the following meaning:

(form data)
PSmk: relative stretching ratio in the m-th channel in the widthwise direction of the strip, (rolling condition data)
PA1k: width of the strip,
PA2k: predicted rolling load,
PA3k: diameter of work rolls, (set values for the form control actuators)
PB1k: edge positions of the upper backup rolls,
PB2k: quarter-out positions of the upper backup rolls,
PB3k: quarter-in positions of the upper backup rolls,
PB4k: edge positions of the lower backup rolls,
PB5k: quarter portions of the lower backup rolls, and
PB6k: bending values of the intermediate roll benders.

Here, the following relationships are set:

$$PSk = \{PSmk\},$$

$$PAk = \{PA1k, PA2k, PA3k\}, \text{ and}$$

$$PBk = \{PB1k, PB2k, PB3k, PB4k, PB5k, PB6k\}.$$

Figure 19:
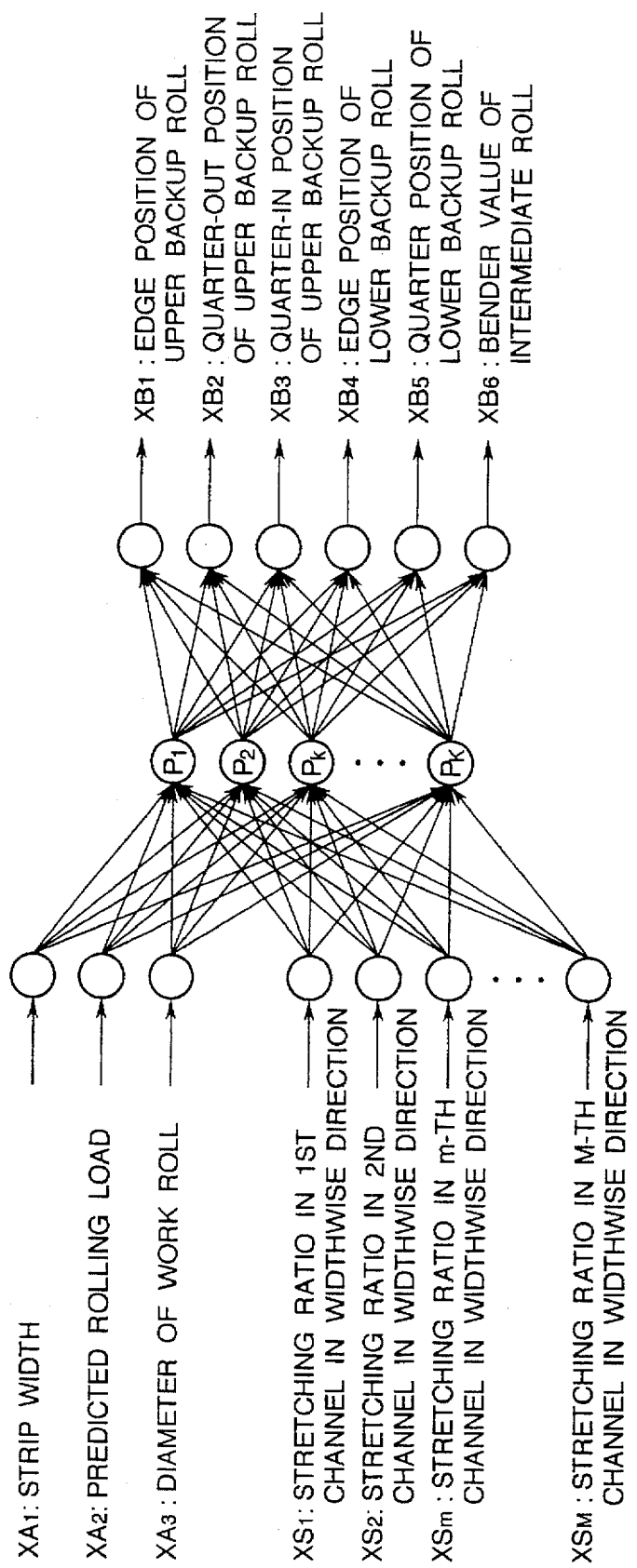
FIG. 19 is a diagram of a network showing an example of a procedure for "OPERATION" in the third embodiment.

Next, the procedure for "OPERATION" will be described with reference to the network of FIG. 19 which shows an example of an operation. In the mode of OPERATION, the degree of similarity of the rolling conditions and the target form of the next strip to the prototype data is obtained, and manipulation amounts of the form control actuators are calculated based on the degree of similarity. In FIG. 19, rolling condition data and target form data are input, and the set values for the form control actuators are output via the prototype units.

When rolling conditions XA and the target form XS of the next strip are expressed as follows:

$$XA = \{XA1, XA2, XA3\},$$

wherein
XA1: width of the strip,
XA2: predicted rolling load, and
XA3: diameter of work rolls, $$XS = \{XSma\},$$

wherein
Xsm: stretching ratio in the m-th channel in the widthwise direction of the strip, The set amounts XB for the form control actuators can be given by the following expression (27):

$$XB = \{XB1k, XB2k, XB3k, XB4k, XB5k, XB6k\} \quad (27)$$

wherein

XB1: edge positions of the upper backup rolls,
XB2: quarter-out positions of the upper backup rolls,
XB3: quarter-in positions of the upper backup rolls,
XB4: edge positions of the lower backup rolls,
XB5: quarter portions of the lower backup rolls, and
XB6: bending values of the intermediate roll benders.

Firstly, using the rolling conditions XA and the target form XS of the next strip and all the prototype units (prototype data), the degree of similarity of the rolling conditions PAk and the form PSk is expressed by using the distance d1(X, Pk) which is represent by the following expression (28):

$$d1(X, Pk) = \|XA - PAk\| + \|XS - PSk\| + \quad (28)$$
$$\left\{ (XA1 - PA1k)^2 + (XA2 - PA2k)^2 + (XA3 - PA3k)^2 + \sum_{m=1}^{M}(Sm - PSmk)^2 \right\}^{1/2}$$

The distance d1(X, Pk) is used as an input for the prototype unit Pk. The output PY1k of the prototype unit Pk at this time is defined as follows:

$$PY1k = f(d1(X, Pk)) \quad (29)$$

Here, f(·) is an input-output function of the prototype units, and is a Gaussian function, such as one represented by the following expression:

$$f(x) = \exp(-x^2/2\sigma^2),$$

wherein σ is a constant. This function takes a larger value when the distance becomes smaller (i.e., the degree of similarity becomes larger).

The set amounts XB for the form control actuators are calculated from the prototype patterns and the degree of similarity. That is, the coupling coefficients PBk of the prototypes are composed in accordance with the output PY1k of the prototype unit so as to obtain the set amounts XB of the form control actuators, as an output. Accordingly, the following equation is satisfied:

$$XB = \sum_{k=1}^{K}(PBk \cdot PY1k) / \sum_{k=1}^{K} PY1k, \quad (30)$$

wherein

XB={XB1, XB2, XB3, XB4, XB5, XB6}, and
PBk={PS1k, PB2k, PB3k, PB4k, PB5k, PB6k}.

The optimal set amounts for the form control actuators can be calculated in the above-described manner. However, when the input data has been subjected to a conversion such as normalization in the procedure for "LEARNING", an inverse conversion is performed for the output value.

Figure 20:
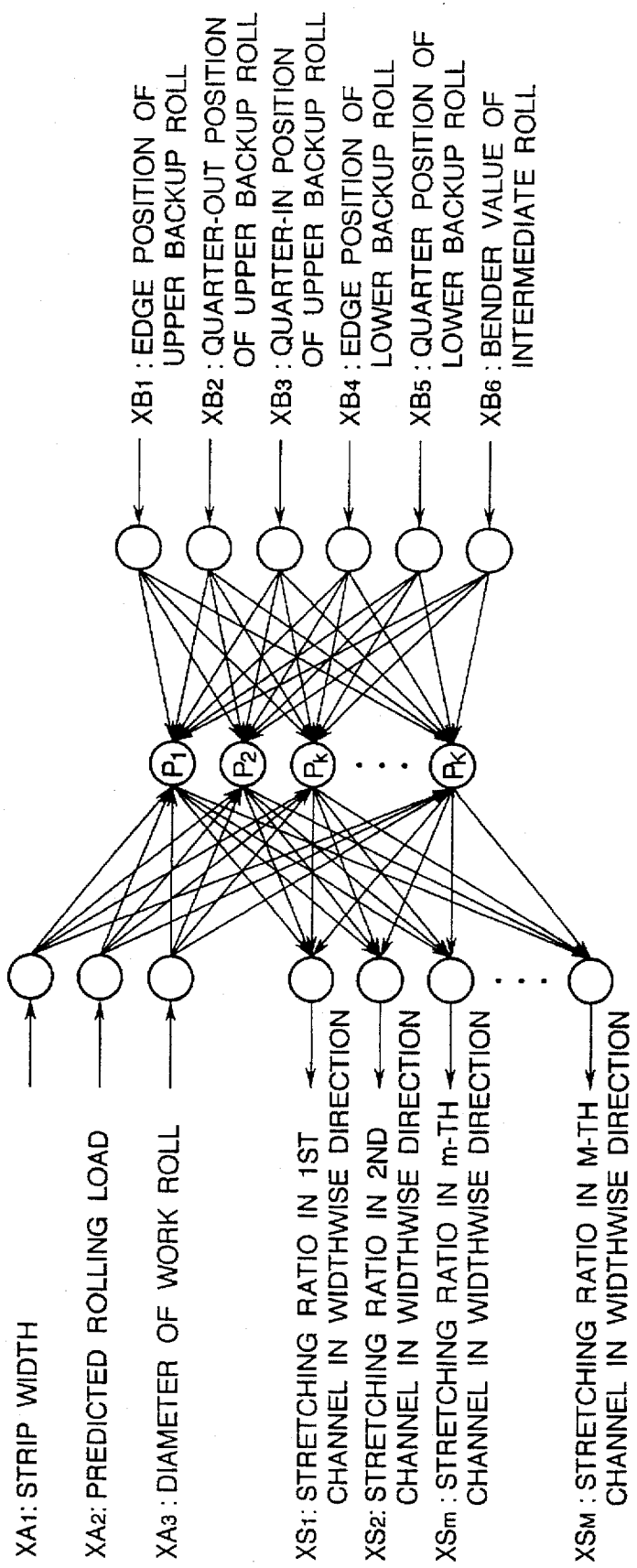
FIG. 20 is a diagram of a network showing an example of a procedure for "BACK OPERATION" in the third embodiment.

Next, the procedure for "BACK OPERATION" in which a predicted form is calculated from the rolling conditions and the set amounts for the form control actuators will be described with reference to the network of FIG. 20, which shows an example of a back operation. In the mode of BACK OPERATION, the degree of similarity of the rolling conditions and the set amounts for the form control actuators to the prototype data is obtained, and form values are calculated based on the degree of similarity. In FIG. 20, rolling condition data and form control actuator data are input, and form data are output via the prototype units.

First, rolling conditions XA, set amounts XB for the form control actuators, and a predicted form XS to be obtained are defined as follows:

$$\text{rolling conditions: } XA = \{XA1, XA2, XA3\} \quad (31)$$

wherein

XA1: width of the strip,
XA2: predicted rolling load, and
XA3: diameter of work rolls, $$\text{set amounts: } XB = \{XB1k, XB2k, XB3k, XB4k, XB5k, XB6k\} \quad (32)$$

wherein

XB1: edge positions of the upper backup rolls,
XB2: quarter-out positions of the upper backup rolls,
XB3: quarter-in positions of the upper backup rolls,
XB4: edge positions of the lower backup rolls,
XB5: quarter portions of the lower backup rolls, and
XB6: bending values of the intermediate roll benders, $$\text{form: } XS = \{XSm\} \quad (33)$$

wherein

XSm: stretching ratio in the m-th cannel in the widthwise direction of the strip.

Using the rolling conditions XA and the set amounts XB for the form control actuators, and all the prototype units (prototype data), the degree of similarity of the rolling conditions PAk and the set amounts XBk for the form control actuators is expressed by using the distance d2(X, Pk) which is represent by the following expression (34):

$$d2(X, Pk) = \|XA - PAk\| + \|XB - PBk\| + \quad (34)$$
$$\{(XA1 - PA1k)^2 + (XA2 - PA2k)^2 +$$
$$(XA3 - PA3k)^2 + (XB1 - PB1k)^2 +$$
$$(XB2 - PB2k)^2 + (XB3 - PB3k)^2 +$$
$$(XB4 - PB4k)^2 + (XB5 - PB5k)^2 +$$
$$(XB6 - PB6k)^2\}^{1/2}$$

The distance d2(X, Pk) is used as an input for the prototype unit Pk. The output PY2k of the prototype unit Pk at this time is defined by the following expression (35):

$$PY2k = f(d2(X, Pk)) \quad (35)$$

Here, f(·) is an input-output function of the prototype units, and is a Gaussian function, such as one represented by the following expression:

$$f(x) = \exp(-x^2/2\sigma^2)$$

wherein σ is a constant. This function takes a larger value when the distance becomes smaller (i.e., the degree of similarity becomes larger).

The form XS is calculated from the prototype patterns and the degree of similarity. That is, the coupling coefficients PSk of the prototypes are composited in accordance with the output PY2k of the prototype unit to obtain the set amounts XS of the form control actuator, as an output. Accordingly, the following equation (36) is satisfied:

$$XS = \Sigma (PSk \cdot PY2k)/\Sigma PY2k \qquad (36)$$

wherein

XS={XSm}, where XSm: stretching ratio in the m-th channel in the widthwise direction of the strip, and PSk={PSmk}, where PSmk: stretching ratio in the m-th channel in the widthwise direction of the strip in the k-th prototype data.

As described above, the predicted form can be calculated by back operation. However, when the input data has been subjected to a conversion such as normalization in the procedure for "LEARNING", an inverse conversion is performed for the output value.

Although Euclidian distance is used as the degree of similarity in the third embodiment, the present invention is not limited thereto.

In the third embodiment, the distribution of stretching ratios in the widthwise direction is use as form data (form index). However, it is possible to use, as the form data, data which are obtained by normalizing the distribution based on the width of a strip such that the number of channels becomes constant.

Also, in the case where the movements of the form control actuators used in initial setting are limited to symmetrical movements in the widthwise direction of the strip, only symmetrical components of the form data can be used as form data. The symmetrical components can be obtained by removing asymmetrical components from the original form data. For example, the original form data is approximated with a function of degree m, and the terms of odd degrees (1st degree, 3rd degree, etc.), which are asymmetrical components, are removed to obtain symmetrical components.

In the present embodiment, data representing actual rolling results are used for "LEARNING". However, it is possible to simulate physical phenomena of rolling so as to calculate form data from rolling conditions and form control set amounts, and to use such calculated form data for "LEARNING". With this arrangement, the learning can be performed accurately even in the case where the actual data cannot be collected sufficiently.

Moreover, LEARNING may be performed whenever the difference between the predicted form obtained by "BACK OPERATION" and the actual form data measured during rolling operation becomes large, so that the accuracy of the control can be maintained.

Although only a limited number of the embodiments of the present invention have been described, it should be understood that the present invention is not limited thereto, and various modifications and variations can be made without departing from the spirit and scope of the invention defined in the accompanying claims.

What is claimed is:

1. A method of controlling a form of a strip in a rolling mill having a form detector for detecting the form of the strip and form control actuators, said form control actuators being manipulated based on an output of said form detector, said method comprising the steps of:

preparing, as prototype manipulation examples, a plurality of paired data of manipulation amounts of the form control actuators and amounts of variations in the form of the strip corresponding to the manipulation amounts;

calculating a degree of similarity between an actual form error representing a difference between an actual form of the strip detected by said form detector and a target form, and variations in the form of said prototype manipulation examples;

weighting manipulation amounts of the actuator contained in said prototype manipulation examples in accordance with calculated degree of the similarity; and manipulating said form control actuators based on weighted actuator manipulation amounts;

wherein a neural network of a radius basic function type is used to prepare and maintain the prototype manipulation examples, and to perform calculation using the prototype manipulation examples.

2. A method of controlling a form of a strip according to claim 1, wherein data representing manipulations of the form control actuators during rolling operation and variations in the form due to the manipulations of the form control actuators are accumulated, as actual result data, and renewal such as correction or addition is performed against the prototype manipulation examples at an arbitrary timing using the actual result data.

3. A method of controlling a form of a strip in a rolling mill according to claim 1, said rolling mill further having a plate shape control, wherein said plate shape control controls a shape and a pattern of a plate and is distributed in a widthwise direction of the plate.

4. A method of controlling a form of a strip in a rolling mill having a form detector for detecting the form of the strip and form control actuators, said form control actuators being manipulated based on an output of said form detector, said method comprising the steps of:

preparing, as prototype form examples, a plurality of paired data, each of which includes a variation in the form of the strip and a composition ratio obtained by decomposing the variation in the form into predetermined standard form patterns;

preparing, as prototype manipulation examples, a plurality of paired data, each of which includes manipulation amounts of said form control actuators and a composition ratio obtained by decomposing the variation in the form, which corresponds to the manipulation amounts, into standard form patterns;

calculating a degree of similarity between an actual form error representing a difference between an actual form of the strip detected by said form detector and a target form, and variations in the form of the prototype form examples;

weighting the composition ratios of said prototype form examples in accordance with the calculated degree of the similarity;

calculating a degree of similarity between a weighted composition ratio and the composition ratios of said prototype manipulation examples;

weighting the actuator manipulation amounts contained in said prototype manipulation examples in accordance with the calculated degree of the similarity; and manipulating said form control actuators based on the weighted actuator manipulation amounts;

wherein a neural network of a radius basic function type is used to prepare and maintain the prototype form examples and the prototype manipulation examples, and to perform calculation using examples.

5. A method of controlling the form of a strip according to claim 4, wherein data representing manipulations of the form control actuators during rolling operation and variations in the form due to the manipulations of the actuators are accumulated, as actual result data, and renewal such as correction or addition is performed against the prototype form examples and the prototype manipulation examples at an arbitrary timing using the actual result data.

6. A method of controlling a form of a strip in a rolling mill according to claim 4, said rolling mill further having a plate shape control, wherein said plate shape control controls a shape and a pattern of a plate and is distributed in a widthwise direction of the plate.

7. A method of controlling a form of a strip in a rolling mill wherein form control actuators for controlling the form of the strip are previously set before rolling said strip, said method comprising the steps of:

preparing a group of form control result data which represents past results of rolling operation, each of which contains a set of data representing rolling conditions for the strip, set values for said form control actuators and a form index of the strip;

extracting a plurality of prototype form control result data from the group of form control result data to hold them as a group of form control standard data;

obtaining a degree of similarity of rolling conditions and a target form index to the form control standard data by providing the rolling conditions and the target form index before starting a rolling operation; and calculating and setting initial setting values for said form control actuators by composing set values for said form control actuators contained in the form control standard data in accordance with the degree of similarity;

wherein a neural network of a radius basic function type is used to extract the plurality of prototype form control result data, to hold extracted data as a group of form control standard data, to calculate the degree of similarity between the combination of rolling conditions and the target form index, which are previously input before rolling operation, and the form control standard data, and to compose and calculate the set values for said form control actuators.

8. A method of controlling a form of a strip according to claim 7, further comprising the steps of:

obtaining a degree of similarity of the rolling conditions and the target form index to the form control standard data;

calculating a form index by composing the form index of the form control standard data in accordance with the degree of similarity; and extracting a plurality of prototype form control result data from the group of form control result data, into which new results of rolling have been added when an error between present form index and actual form index measured in actual rolling exceeds a predetermined value, to hold them as the group of form control standard data.

9. A method of controlling a form of a strip in a rolling mill according to claim 7, said rolling mill further having a plate shape control, wherein said plate shape control controls a shape and a pattern of a plate and is distributed in a widthwise direction of the plate.

* * * * *